United States Patent
Alexander et al.

(10) Patent No.: US 11,674,434 B2
(45) Date of Patent: Jun. 13, 2023

(54) MULTIPLE CYLINDER ENGINE

(71) Applicant: FNA Group, Inc., Pleasant Prairie, WI (US)

(72) Inventors: Gus Alexander, Inverness, IL (US); Richard J. Gilpatrick, Burlington, WI (US); Robert E. Dowd, Oconomowoc, WI (US); Brian W. Hubbard, West Bend, WI (US); George Panagiotis Klonis, New Berlin, WI (US); Michael Heggen Inouye, Pewaukee, WI (US); Daniel L. Riley, Hartland, WI (US)

(73) Assignee: IMPACT CONSULTING AND ENGINEERING LLC, Naples, FL (US)

( * ) Notice: Subject to any disclaimer, the term of this patent is extended or adjusted under 35 U.S.C. 154(b) by 0 days.

(21) Appl. No.: 17/012,964

(22) Filed: Sep. 4, 2020

(65) Prior Publication Data
US 2022/0003162 A1   Jan. 6, 2022

Related U.S. Application Data

(60) Provisional application No. 63/047,470, filed on Jul. 2, 2020.

(51) Int. Cl.
F02B 75/28 (2006.01)
F02B 75/02 (2006.01)
F02B 3/06 (2006.01)

(52) U.S. Cl.
CPC ............. *F02B 75/282* (2013.01); *F02B 3/06* (2013.01); *F02B 2075/027* (2013.01)

(58) Field of Classification Search
CPC .. F02B 2075/027; F02B 2275/18; F02B 3/06; F02B 75/22; F02D 41/0087
See application file for complete search history.

(56) References Cited

U.S. PATENT DOCUMENTS 1,579,332 A   4/1926   Metten
3,446,192 A   5/1969   Woodward
(Continued)

FOREIGN PATENT DOCUMENTS

AT   562383 B    11/1912
AT   509208 A4   7/2011
(Continued)

OTHER PUBLICATIONS

Unknown, Victa 500 Twin Mower on PushMowerRepair.com retrieved online at https://pushmowerrepair.com.au/identify-victa/rare-victa-2-stroke-mowers/ (2018).
(Continued)

*Primary Examiner* — Kevin A Lathers
(74) *Attorney, Agent, or Firm* — Brian J. Colandreo; Jeffery T. Placker; Holland & Knight LLP

(57) ABSTRACT

An internal combustion engine may include a first piston reciprocatingly disposed in a first cylinder, and a second piston reciprocatingly disposed in a second cylinder. A crankshaft may be coupled with the first piston and the second piston for rotational motion associated with reciprocating movement of at least one of the first piston and the second piston. A combustion chamber may be fluidly coupled with the first cylinder and the second cylinder. An ignition source may be at least partially disposed within the combustion chamber. An intake valve may provide selective fluid communication between an intake system and the combustion chamber, and an exhaust valve may provide selective fluid communication between an exhaust system and the combustion chamber.

20 Claims, 32 Drawing Sheets

FIG. 11

(56) References Cited

U.S. PATENT DOCUMENTS

| | | | |
|---|---|---|---|
| 6,318,310 | B1 | 11/2001 | Clarke |
| 7,055,470 | B2 | 6/2006 | Kreuter et al. |
| 7,685,975 | B2 | 3/2010 | Springer |
| 8,763,391 | B2 | 7/2014 | Kamen et al. |
| 8,833,339 | B2 | 9/2014 | Koenig |
| 8,899,193 | B2 | 12/2014 | Lippitt et al. |
| 9,217,365 | B2 | 12/2015 | Lippitt et al. |
| 9,664,044 | B2 | 5/2017 | Lippitt et al. |
| 9,797,340 | B2 | 10/2017 | Kamen et al. |
| 9,874,141 | B2 | 1/2018 | Bucksey |
| 10,018,112 | B2 | 7/2018 | Cocanougher et al. |
| 10,054,034 | B1 | 8/2018 | Weland |
| 10,344,670 | B2 | 7/2019 | Cocanougher et al. |
| 10,378,431 | B2 | 8/2019 | Tour et al. |
| 10,514,081 | B2 | 12/2019 | Kamiyama et al. |
| 10,626,792 | B2 | 4/2020 | Cheng |
| 10,626,831 | B2 | 4/2020 | Mukohara et al. |
| 10,690,050 | B2 | 6/2020 | Cocanougher et al. |
| 2004/0226523 | A1 | 11/2004 | Kreuter et al. |
| 2004/0255882 | A1* | 12/2004 | Branyon ............. F02B 33/22 123/70 R |
| 2005/0103288 | A1 | 5/2005 | Leroy |
| 2007/0079788 | A1 | 4/2007 | Betzmeir |
| 2007/0157894 | A1 | 7/2007 | Scuderi |
| 2008/0083328 | A1 | 4/2008 | Paul |
| 2009/0056331 | A1* | 3/2009 | Zhao ............. F02B 41/06 60/524 |
| 2009/0151663 | A1 | 6/2009 | Pastor Alvarez |
| 2009/0159023 | A1 | 6/2009 | Springer |
| 2010/0147236 | A1 | 6/2010 | Springer |
| 2010/0218744 | A1 | 9/2010 | Simon |
| 2011/0011079 | A1 | 1/2011 | Kamen et al. |
| 2011/0258999 | A1 | 10/2011 | Ingersoll |
| 2013/0087120 | A1 | 4/2013 | König |
| 2014/0261338 | A1 | 9/2014 | Lippitt |
| 2014/0360458 | A1 | 12/2014 | Cocanougher et al. |
| 2015/0047336 | A1 | 2/2015 | Kamen et al. |
| 2015/0136069 | A1 | 5/2015 | Lippitt |
| 2015/0136083 | A1 | 5/2015 | Lippitt |
| 2015/0142291 | A1 | 5/2015 | Lippitt et al. |
| 2015/0345410 | A1 | 12/2015 | Wirth |
| 2016/0252012 | A1 | 9/2016 | Bucksey |
| 2017/0335921 | A1 | 11/2017 | Kamiyama et al. |
| 2018/0094577 | A1* | 4/2018 | Cocanougher ........ F02B 75/228 |
| 2018/0266308 | A1 | 9/2018 | Tour et al. |
| 2018/0283328 | A1 | 10/2018 | Mukohara et al. |
| 2018/0291836 | A1 | 10/2018 | Langenfeld et al. |
| 2018/0363548 | A1 | 12/2018 | Cocanougher et al. |
| 2019/0120136 | A1 | 4/2019 | Cheng |
| 2019/0309679 | A1 | 10/2019 | Cocanougher et al. |

FOREIGN PATENT DOCUMENTS

| | | |
|---|---|---|
| AT | 509208 B1 | 7/2011 |
| AU | 2013381692 A1 | 11/2015 |
| AU | 2013381692 A2 | 6/2016 |
| AU | 2018101638 A4 | 12/2018 |
| AU | 2018256587 A1 | 6/2019 |
| AU | 2018256587 B2 | 9/2020 |
| BR | PI0621887 A2 | 12/2011 |
| BR | 102017010304 A2 | 12/2017 |
| BR | 102018073962 A1 | 9/2019 |
| BR | 102018073962 A2 | 9/2019 |
| CA | 2908937 A1 | 9/2014 |
| CA | 2960339 A1 | 4/2015 |
| CA | 3021866 A1 | 1/2019 |
| CA | 3021866 C | 9/2019 |
| CN | 101512123 A | 8/2009 |
| CN | 202065052 U | 12/2011 |
| CN | 102959182 A | 3/2013 |
| CN | 102959182 B | 4/2016 |
| CN | 106030036 A | 10/2016 |
| CN | 107387661 A | 11/2017 |
| CN | 109057960 A | 12/2018 |
| CN | 109139248 A | 1/2019 |
| CN | 109139249 A | 1/2019 |
| CN | 106030036 B | 3/2019 |
| CN | 109630264 A | 4/2019 |
| CN | 107387661 B | 11/2019 |
| CN | 110529246 A | 12/2019 |
| CN | 110778394 A | 2/2020 |
| DE | 89873 C | 2/1895 |
| DE | 120103 C | 4/1899 |
| DE | 10311358 A1 | 9/2004 |
| DE | 10352243 A1 | 6/2005 |
| DE | 102005001762 A1 | 7/2006 |
| DE | 102005001762 B4 | 7/2007 |
| DE | 10352243 B4 | 2/2009 |
| DE | 102008023390 A1 | 11/2009 |
| DE | 10311358 B4 | 4/2010 |
| DE | 102018204651 A1 | 10/2018 |
| DE | 202018105989 U1 | 11/2018 |
| DE | 102018204651 B4 | 5/2019 |
| EA | 200900296 A1 | 6/2009 |
| EA | 014895 B1 | 2/2011 |
| EP | 2053219 A1 | 4/2009 |
| EP | 2558683 A1 | 2/2013 |
| EP | 2558683 B1 | 8/2015 |
| EP | 2971644 A1 | 1/2016 |
| EP | 3068973 A1 | 9/2016 |
| EP | 2971644 A4 | 1/2017 |
| EP | 3246594 A1 | 11/2017 |
| EP | 3489492 A1 | 5/2019 |
| EP | 3246594 B1 | 7/2020 |
| ES | 2553386 T3 | 12/2015 |
| FR | 388926 A | 8/1908 |
| FR | 398895 A | 6/1909 |
| FR | 451628 A | 4/1913 |
| FR | 475035 A | 4/1915 |
| FR | 493889 A | 8/1919 |
| FR | 527014 A | 10/1921 |
| FR | 557346 A | 8/1923 |
| FR | 560189 A | 9/1923 |
| FR | 584890 A | 2/1925 |
| FR | 644078 A | 10/1928 |
| FR | 699786 A | 2/1931 |
| FR | 925762 A | 9/1947 |
| FR | 2905410 A1 | 3/2008 |
| FR | 2905410 B1 | 1/2012 |
| GB | 190901598 A | 10/1909 |
| GB | 190915026 A | 6/1910 |
| GB | 191114540 A | 3/1912 |
| GB | 191206029 A | 3/1913 |
| GB | 183603 A | 8/1922 |
| GB | 201606 A | 7/1923 |
| GB | 190467 A | 1/1924 |
| GB | 195404 A | 4/1924 |
| GB | 220418 A | 8/1924 |
| GB | 277429 A | 9/1927 |
| GB | 367236 A | 2/1932 |
| GB | 661029 A | 11/1951 |
| IL | 245160 B | 3/2019 |
| JP | 2004278536 A | 10/2004 |
| JP | 2013524094 A | 6/2013 |
| JP | 5735632 B2 | 6/2015 |
| JP | 2016533449 A | 10/2016 |
| JP | 2017207053 A | 11/2017 |
| JP | 6389250 B2 | 9/2018 |
| JP | 2018168818 A | 11/2018 |
| JP | 2019011761 A | 1/2019 |
| JP | 6597652 B2 | 10/2019 |
| KR | 200303198 Y1 | 2/2003 |
| KR | 20040031376 A | 4/2004 |
| KR | 20130038251 A | 4/2013 |
| KR | 20160102162 A | 8/2016 |
| KR | 101751033 B1 | 7/2017 |
| KR | 20170129618 A | 11/2017 |
| KR | 101958548 B1 | 3/2019 |
| MX | 2008015124 A | 12/2008 |
| MX | 2018014302 A | 8/2019 |
| NL | 11386 C | 12/1921 |
| NL | 33628 C | 4/1932 |
| RU | 2671666 C1 | 11/2018 |

(56) References Cited

FOREIGN PATENT DOCUMENTS

| | | |
|---|---|---|
| SE | 501997 C2 | 7/1995 |
| SU | 31704 A1 | 8/1933 |
| TW | M557302 U | 3/2018 |
| WO | 2008015331 A2 | 2/2008 |
| WO | 2008016289 A1 | 2/2008 |
| WO | 2008031175 A1 | 3/2008 |
| WO | 2008015331 A3 | 4/2008 |
| WO | 2008016289 A9 | 7/2009 |
| WO | 2009082709 A2 | 7/2009 |
| WO | 2009082709 A3 | 10/2009 |
| WO | 2011127502 A1 | 10/2011 |
| WO | 2014143211 A1 | 9/2014 |
| WO | 2015056015 A1 | 4/2015 |

OTHER PUBLICATIONS

Unknown, Victa Supreme on PushMowerRepair.com retrieved online at https://pushmowerrepair.com.au/identify-victa/rare-victa-2-stroke-mowers/ (2018).

Unknown, Sheldon's EMU—Connaught Flat_Twin Engines 1914-1915 retrieved online at https://cybermotorcycle.com/marques/connaught/connaught-1914-flat-twin.htm (2022).

Non-Final Office Action issued in U.S. Appl. No. 17/013,017 dated Dec. 21, 2021.

Non-Final Office Action issued in U.S. Appl. No. 17/013,056 dated Dec. 21, 2021.

Non-Final Office Action issued in U.S. Appl. No. 17/013,095 dated Feb. 18, 2022.

Notice of Allowance issued in related U.S. Appl. No. 17/013,017 dated Oct. 25, 2022.

Final Office Action issued in related U.S. Appl. No. 17/013,017 dated Jul. 28, 2022.

Non-Final Office Action issued in related U.S. Appl. No. 17/013,056 dated Aug. 1, 2022.

Notice of Allowance issued in related U.S. Appl. No. 17/013,017 dated Jan. 25, 2022.

* cited by examiner

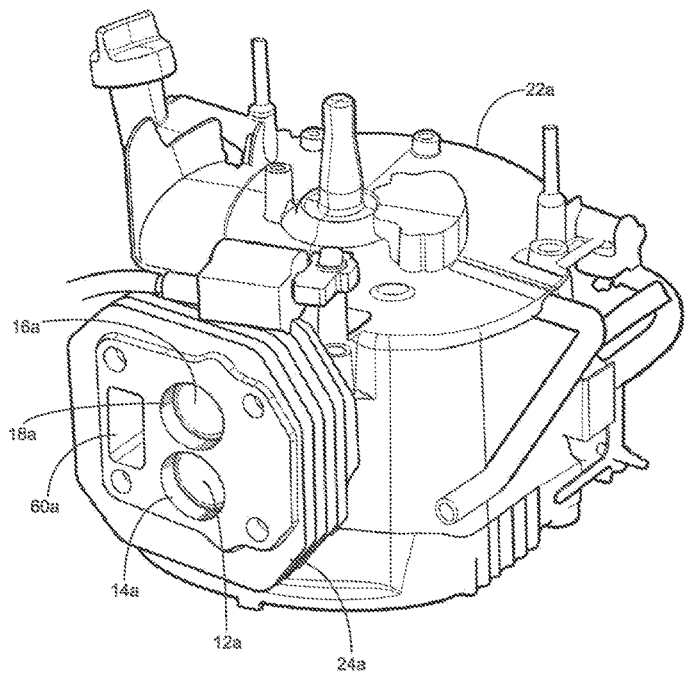
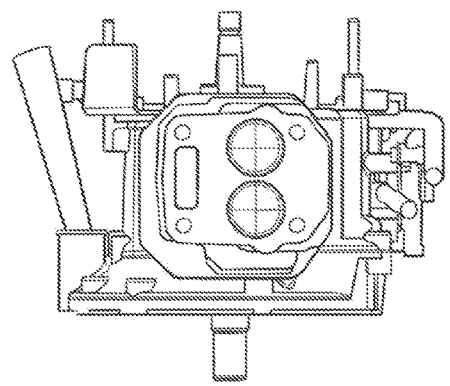
FIG. 1
FIG. 2

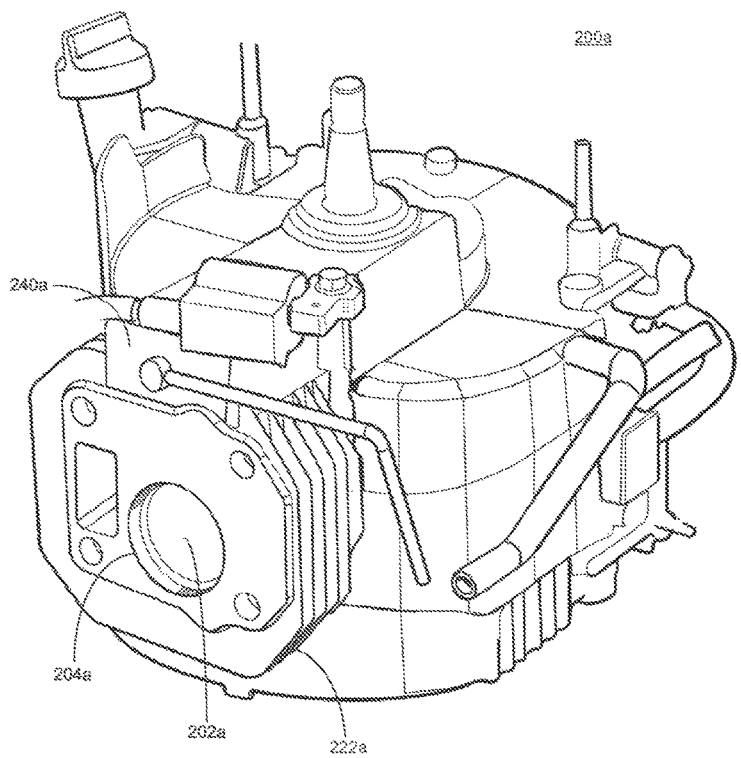
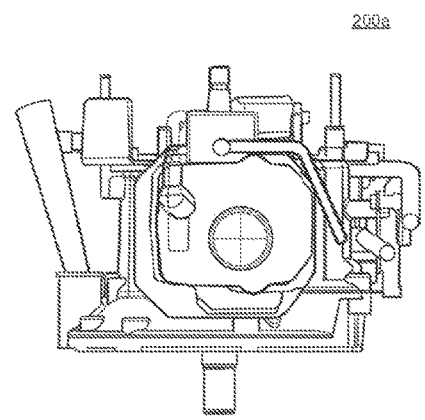
FIG. 49
FIG. 50

MULTIPLE CYLINDER ENGINE

CROSS-REFERENCE TO RELATED APPLICATION

This application claims the benefit of U.S. provision application Ser. No. 63/047,470, filed on Jul. 2, 2020, entitled "Multiple Cylinder Engine," the entire disclosure of which is incorporated herein by reference.

TECHNICAL FIELD

The present disclosure generally relates to internal combustion engines, and more particularly relates to multiple cylinder internal combustion engines.

BACKGROUND

Internal combustion engines are widely used for a variety of purposes. In many situations, internal combustion engines are used for power pieces of power equipment, particularly in situations where utilizing an electric motor would be inconvenient or impractical, such as when access to residential or commercial power supplies may be unavailable or when electrical power cords or extension cords would be cumbersome or dangerous. For example, often outdoor power equipment such lawnmowers, power washers, snow blowers, etc., utilize internal combustion engines as a power source. Frequently, in such applications the internal combustion engine may include a single cylinder, relatively small displacement engine. While such engines are typically cost effective and simple, many opportunities exist for improving the function, performance, and/or operation of such internal combustion engines.

SUMMARY

According to an implementation, an internal combustion engine may include a first piston reciprocatingly disposed in a first cylinder, and a second piston reciprocatingly disposed in a second cylinder. A crankshaft may be coupled with the first piston and the second piston for rotational motion associated with reciprocating movement of at least one of the first piston and the second piston. A combustion chamber may be fluidly coupled with the first cylinder and the second cylinder. An ignition source may be at least partially disposed within the combustion chamber. An intake valve may provide selective fluid communication between an intake system and the combustion chamber. An exhaust valve may provide selective fluid communication between an exhaust system and the combustion chamber.

One or more of the following features may be included. The crankshaft may be configured to be disposed in a generally vertical orientation during operation. The first cylinder and the second cylinder may be arranged in a parallel-inline configuration. The first cylinder and the second cylinder may be arranged in an offset configuration. The first cylinder and the second cylinder may have substantially the same diameter. The first cylinder and the second cylinder may have different diameters. The crankshaft may be coupled with the first piston via a first crank journal and may be coupled with the second piston via a second crank journal. The crankshaft may be coupled with the first piston and the second piston via a first crank journal. The combustion chamber may include a cavity overlying at least a portion of the first cylinder and at least a portion of the second cylinder. The combustion chamber may include a first cavity portion at least partially overlying at least a portion of the first cylinder, and a second cavity portion at least partially overlying at least a portion of the second cylinder. The first cavity portion may be at least partially separated from the second cavity portion. The ignition source may include a spark plug. The ignition source may include a first spark plug associated with the first cylinder and a second spark plug associated with the second cylinder.

The intake valve and the exhaust valve may be arranged in an overhead valve configuration. The intake valve and the exhaust valve may be arranged in a flathead configuration.

According to another implementation, an internal combustion engine may include a first piston reciprocatingly disposed in a first cylinder, and a second piston reciprocatingly disposed in a second cylinder. The second piston may have a diameter that is less than a diameter of the first piston. The second piston may be disposed vertically above the first piston during operation. A crankshaft may be coupled with the first piston and the second piston for rotational motion associated with reciprocating movement of at least one of the first piston and the second piston. The crankshaft may be configured to be disposed in a generally vertical orientation during operation. A combustion chamber may be fluidly coupled with the first cylinder and the second cylinder. An ignition source may be at least partially disposed within the combustion chamber. An intake valve may provide selective fluid communication between an intake system and the combustion chamber. An exhaust valve may provide selective fluid communication between an exhaust system and the combustion chamber.

One or more of the following features may be included. The first cylinder and the second cylinder may be formed in an engine block. The engine block may include a plurality of cooling fins configured to provide air cooling of the internal combustion engine. The crankshaft may be coupled with the first piston and the second piston via a first crank journal. The crankshaft may be coupled with the first piston via a first crank journal and may be coupled with the second piston via a second crank journal.

According to yet another implementation, an internal combustion engine may include a first piston reciprocatingly disposed in a first cylinder, the first cylinder having a first diameter, and a second piston reciprocatingly disposed in a second cylinder, the second cylinder having a second diameter that is substantially the same as the first diameter. A crankshaft may be coupled with the first piston and the second piston for rotational motion associated with reciprocating movement of at least one of the first piston and the second piston. The crankshaft may be configured to be disposed in a generally vertical orientation during operation. A combustion chamber may be fluidly coupled with the first cylinder and the second cylinder. An ignition source may be at least partially disposed within the combustion chamber. An intake valve may provide selective fluid communication between an intake system and the combustion chamber. An exhaust valve may provide selective fluid communication between an exhaust system and the combustion chamber.

One or more of the following features may be included. The first cylinder and the second cylinder may be formed in an engine block. The engine block may include a plurality of cooling fins configured to provide air cooling of the internal combustion engine.

BRIEF DESCRIPTION OF THE DRAWINGS

FIGS. 1 through 4 depict an illustrative example embodiment of a multiple cylinder internal combustion engine including multiple fired cylinders, according to an example implementation;

FIGS. 49 through 53 depict another illustrative example embodiment of a multiple cylinder internal combustion engine, according to an example implementation;

DESCRIPTION OF EXAMPLE EMBODIMENTS

Figure 3:
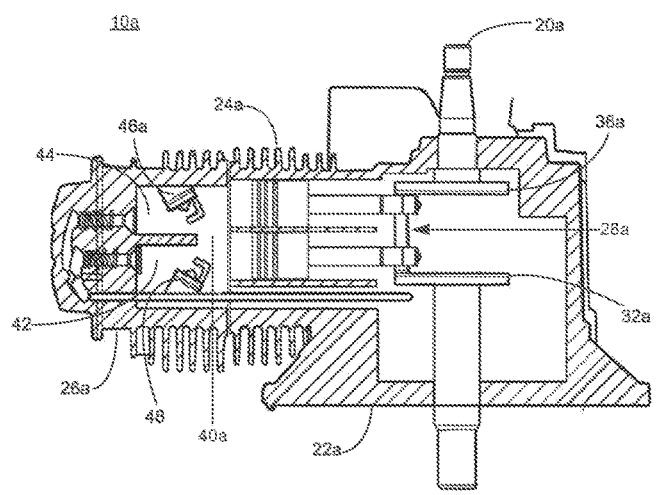

In general, the present disclosure relates to internal combustion engines having multiple cylinders. For the clarity of description and illustration, the present disclosure will generally relate to internal combustion engines including two cylinders. However, it will be appreciated that internal combustion engines consistent with the present disclosure may include a greater number of cylinders. As such, the present disclosure should not be limited to internal combustion engines having only two cylinders. Consistent with the present disclosure, the internal combustion engine may include a four-cycle engine, such as a gasoline engine or a propane engine. In additional implementations, the engine may include a diesel engine or a two-stroke engine. In some embodiments, the engine may include an air cooled engine, e.g., in which at least a portion of the cooling of the engine is accomplished by radiant cooling and/or convective cooling of at least a portion of the engine. For example, the at least a portion of the engine, such as the engine block (which may contain and/or define one or more of the cylinders) and/or the cylinder head (e.g., which may contain and/or define at least a portion of the combustion chamber) may include fins, or other features, that may facilitate radiative cooling and/or convective cooling (e.g., as a result of air movement across the features) of the engine. In some implementations, at least a portion of the cooling may be accomplished through the use of a liquid heat transfer medium, such as the lubricating oil of the engine, a water, glycol, etc., based coolant, or the like. Consistent with some such implementations, the liquid heat transfer medium may be splashed onto one or more pistons of the engine, may pass through (e.g., via liquid passages) at least a portion of the engine block and/or cylinder head, or the like. In some such implementations, the liquid may further pass through a heat transfer structure, such as a liquid-air heat exchanger (such as a radiator) and/or may pass through a reservoir (such as a crankcase) which may have fins and/or other heat dissipating structures.

According to some implementations, an internal combustion engine consistent with the present disclosure may include multiple cylinders (each having a corresponding reciprocating piston) that may, at least in part, participate in the four cycle combustion process. That is, two or more cylinders may participate in one or more of an intake of a fuel-air mixture, the compression of the fuel-air mixture, the combustion of the fuel-air mixture, power generation from the combustion of the fuel-air mixture, and exhaust of the combustion products of the fuel-air mixture. For example, at least two cylinders may be at least partially filled with the fuel-air mixture, and the corresponding pistons of the at least two cylinders may be caused to reciprocate within the respective cylinders, at least in part, by the combustion of the fuel-air mixture. Herein, cylinders that may, at least in part, participate in the combustion process may also be referred to as fired cylinders.

According to some implementations, an internal combustion engine consistent with the present disclosure may include one, or more than one, fired cylinder, and may include one or more additional cylinders (e.g., which may include a respective reciprocating piston) that may assist in at least a portion of the operation of the internal combustion engine. For example, in some implementations, an internal combustion engine may include at least one fired cylinder and at least one cylinder that may perform a fluid pumping function. In some such implementations, the at least one cylinder performing a fluid pumping function may pressurize a fluid (such as gas or a liquid) within a pressure accumulator. The pressurized fluid may selectively be released from the pressure accumulator to assist in at least a portion of the operation of the engine, such as being utilized to start the internal combustion engine, and/or assist in starting of the internal combustion engine. In some implementations, the at least one cylinder performing a fluid pumping function may convey air and/or a fuel-air mixture from the at least one firing cylinder. Consistent with such an implementation, the at least one cylinder performing the fluid pumping function may pre-charge the at least one fired cylinder, may increase the fuel-air volume within the at least one fired cylinder (e.g., as compared to the fuel-air volume that may be achieved in the at least one fired cylinder without the aid of the at least one cylinder performing the pumping function).

According to some implementations, an internal combustion engine consistent with the present disclosure may include one, or more than one, fired cylinders, and may include at least one cylinder (including a respective reciprocating piston), in which the respective reciprocating piston may impart a vibrational characteristic to the internal combustion engine. For example, the vibrational characteristic may, at least in part, counterbalance vibration induced by the fired cylinder (i.e., reciprocation of the fired piston), and/or may tune a vibrational characteristic of the internal combustion engine, e.g., by modifying the vibration induced by the fired piston and/or other components of the internal combustion engine (e.g., the valve cam shaft(s), the valves, the crankshaft, etc.).

Consistent with a first illustrative example embodiment of an internal combustion engine consistent with the present disclosure is shown. As shown, the internal combustion engine an air cooled, four stroke engine, as generally discussed above. Further, as generally shown, the internal combustion engine may generally include a first piston reciprocatingly disposed in a first cylinder, and a second piston reciprocatingly disposed in a second cylinder. A crankshaft may be coupled with the first piston and the second piston for rotational motion associated with reciprocating movement of at least one of the first piston and the second piston. That is, for example, rotation of the crankshaft may cause reciprocating movement of the first piston and the second piston. Similarly, reciprocating movement of the first piston and/or of the second piston may cause rotation of the crankshaft. The internal combustion engine may further include a combustion chamber that may be fluidly coupled with the first cylinder and the second cylinder. That is, the combustion chamber, together with the first cylinder and the second cylinder may define a fluid volume (e.g., which may vary depending upon reciprocating movement and/or positon of the first piston and the second piston within the respective first cylinder and second cylinder. In some such embodiments, the combustion chamber may be disposed at a distal end (e.g., relative to the crankshaft) of the first cylinder and the second cylinder, and may, at least in part, enclose the distal ends of the first cylinder and the second cylinder.

The internal combustion engine may further include an ignition source, which may selectively ignite a fuel-air mixture within one, or both, of the first cylinder, the second cylinder, and the combustion chamber. In some embodiments, the ignition source may be at least partially disposed within the combustion chamber. The internal combustion engine may further include one, or more than one, intake valve(s) that may provide selective fluid communication between an intake system and the combustion chamber. For example, the one or more intake valves may be selectively opened (e.g., during at least the intake cycle of the internal combustion engine) to allow a fuel-air mixture to be drawn into one or more of the first cylinder, the second cylinder, and the combustion chamber by way of an intake runner or manifold, e.g., which may be coupled with a carburetor or fuel injection system (e.g., to facilitate the mixing of fuel with air prior to, or during the fuel-air mixture entering via the intake valve. The intake valve may also be selectively closed to prevent flow from one or more of the first cylinder, the second cylinder, and the combustion chamber back into the intake system (e.g., during one or more of the compression cycle, the power cycle, and the exhaust cycle of the internal combustion engine). The internal combustion engine may also include an exhaust valve that may provide selective fluid communication between an exhaust system and the combustion chamber. That is, the exhaust valve may be selectively opened to allow combusted fuel-air mixture to the expelled from one or more of the first cylinder, the second cylinder, and the combustion chamber (e.g., during at least the exhaust cycle of the internal combustion engine). The exhaust system may include, for example, and exhaust runner and/or an exhaust manifold, e.g., which may be coupled with a muffler. In a similar manner as the intake valve, the exhaust valve may be selectively closed, e.g., to prevent flow from one or more of the first cylinder, the second cylinder, and the combustion chamber into the exhaust system (e.g., during one or more of the intake cycle, the compression cycle, and the power cycle of the internal combustion engine).

Continuing with the foregoing, and referring also to at least FIGS. 1 through 4, an illustrative example embodiment of an internal combustion engine 10a is shown. As shown, the internal combustion engine 10a may include an air cooled, four stroke engine, as generally discussed above. Further, as generally shown, the internal combustion engine may generally include a first piston 12a reciprocatingly disposed in a first cylinder 14a, and a second piston 16a reciprocatingly disposed in a second cylinder 18a. The internal combustion engine 10a may further include a crankshaft 20a, which may be coupled with the first piston and the second piston for rotational motion associated with reciprocating movement of at least one of the first piston and the second piston. As generally described above, the first piston 12a and the second piston 16a may move in a reciprocating manner within the respective first cylinder 14a and the second cylinder 18a to draw a fuel-air mixture into the internal combustion engine, compress the fuel-air mixture, to generate power upon combustion of the fuel-air mixture, and to exhaust the combusted fuel-air mixture. In general, the reciprocating motion of the first piston 12a and the second piston 16a may be induced by the rotational inertia of the crankshaft 20a. The reciprocating motion of the first piston 12a and the second piston 16a may be, at least in part, based upon the combustion of the fuel-air mixture, which may, in turn, impart rotational motion on (and/or increase the rotational inertial of) the crankshaft 20a.

As generally shown, the internal combustion engine 10a may additionally include a crankcase 22a, or engine housing, in which the crankshaft 20a may be at least partially disposed and/or supported. Further, the internal combustion engine may include an engine block 24a. As shown, the first cylinder 14a and the second cylinder 18a may be at least partially, and/or entirely, disposed within and/or formed within, the engine block 24a. As also shown, for example in FIGS. 3 and 4, the internal combustion engine 10a may also include a cylinder head 26a, e.g., which may at least partially overlie a distal end (relative to the crankshaft) of the engine block 24a and the first cylinder 14a and the second cylinder 18a.

Consistent with some implementation, the crankshaft 20a may be configured to be disposed in a generally vertical orientation during operation. For example, as generally shown in FIGS. 1 through 3, during intended operation of the internal combustion engine 10, the crankshaft 20a may be generally disposed in a vertical orientation, and the first cylinder 14a and the second cylinder 18a (as well as the reciprocating movement of the first piston 12a and the second piston 16a) may be in a generally horizontal orientation. It will be appreciated, however, that during use the orientation of the crankshaft 20a may vary. For example, the internal combustion engine 10 may be coupled with a housing, chassis, or piece of power equipment (such as, but not limited to, a lawn mower, a pressure washer, a snow blower, etc.), which may be disposed on, or travel across, an angles surface. Accordingly, during use of the internal combustion engine 10, the crankshaft 20a may often be positioned in orientations other than vertical.

Consistent with some implementations, such as shown in connection with internal combustion engine 10a, depicted in FIGS. 1-4, the first cylinder 14a and the second cylinder 18a may be arranged in a parallel-inline configuration. That is, and with particular reference to FIGS. 3 and 4, the crankshaft 20a may lie in a plane through the centerlines of the first cylinder 14a and the second cylinder 18a. As such, the first cylinder 14a and the second cylinder 18a may be parallel with one another, and may be in-line with one another and the crankshaft 20a.

Consistent with some implementations, the first cylinder and the second cylinder may be arranged in an offset configuration. For example, and referring to the illustrative example embodiment shown in FIGS. 5 through 8, an internal combustion engine 10b is shown including a first piston 12b reciprocatingly disposed within a first cylinder 14b, and a second piston 16b reciprocatingly disposed within a second cylinder 18b. As shown, the first cylinder 14b and the second cylinder 18b may be offset from one another with respect to a crankshaft 20b, to which the first piston 12b and the second piston 16b are coupled. That is, the crankshaft 20b does not lie within a plane passing through the centerlines of the first cylinder 14b and the second cylinder 18b. Consistent with such a configuration, the first cylinder 14b and the second cylinder 18b may be arranged in an at least partial V-configuration. As shown, the first cylinder 14b and the second cylinder 18b may be arranged in a shallow V-configuration, e.g., in which, while the first cylinder 14b and the second cylinder 18b are partially offset, the first cylinder 14b and the second cylinder 18b may be at least partially overlapping. Consistent with such a configuration, the first cylinder 14b and the second cylinder 18b may be formed within a single cylinder block 24b, and may be at least partially enclosed by a single cylinder head 26b. it will be appreciated, however, that while the implementation shown in FIGS. 5 through 8 include a shallow V-configuration, that other configurations (e.g., which may include a deeper V-configuration, in which the cylinders may only partially overlap and/or may not overlap) are considered within the present disclosure.

It will be appreciated that in some implementations, in which the cylinders may be at least partially offset set to either side of the crankshaft centerline, during reciprocating motion of the pistons (which may be coupled with the crankshaft) one of the pistons may "lead" the other piston. That is, for example, the reciprocating motion of one of the pistons may be slightly ahead of the reciprocating motion of the other piston. As such, one piston may reach top-dead-center at least slightly ahead of (e.g., time-wise and/or based on the rotational cycle of the crankshaft) the other piston, and may reach bottom-dead-center at least slightly ahead of the other piston. In some implementations this leading-piston attribute may be utilized, e.g., to slightly increase the compression pressure of the fuel-air mixture at the time of ignition. For example, often internal combustion engines ignite a cylinder (i.e., the fuel-air mixture within, or associated with, a particular cylinder) a couple of degrees before the piston reaches top-dead-center. In an arrangement including offset cylinders, the leading piston may be allowed to advance further toward (or beyond) top-dead-center prior to ignition than would normally occur. This may result in a relatively higher fuel-air mixture pressure at the time of ignition (e.g., with the trailing piston being closer to a conventional position at the time of ignition). It will be appreciated that other configurations may also be utilized.

In some example embodiments consistent with the present disclosure, the first cylinder and the second cylinder may have substantially the same diameter. For example, as shown in the illustrative example internal combustion engines 10a, 10b shown in FIGS. 1 through 8, the first cylinder 14a, 14b and the second cylinder 18a, 18b may have diameters that are substantially the same. Consistent with some such embodiments, the displacement of the engine may be generally evenly divided between the two cylinders (although the geometry of the combustion chamber may impact the division of the total engine displacement between the cylinders). Further, it will be appreciated that, similar to the cylinders, the pistons may also have substantially the same diameter. Additionally, it will be appreciated that the description substantially the same diameter is not intended to require exactly the same diameter, but rather should also be construed as encompassing minor differences in diameter.

In addition to implementations including cylinders having substantially the same diameters, consistent with some embodiments, the first cylinder and the second cylinder may have different diameters. For example, and referring also to FIGS. 9 through 12, an illustrative example embodiment of an internal combustion engine 10c is shown including a first piston 12c reciprocatingly disposed in a first cylinder 14c, and a second piston 16c reciprocatingly disposed in a second cylinder 18c. As shown in the depicted embodiment, the first cylinder 14c may have a larger diameter than the second cylinder 18c. Consistent with various embodiments, the difference in diameter between the first cylinder and the second cylinder may be relatively small, and/or may be relatively significant. For example, the second cylinder may have a diameter that is between about 90% to about 10% of the diameter of the first cylinder, although the difference between the diameters of the cylinders may be greater or smaller. Consistent with the illustrated embodiment of FIGS. 9 through 12, the second cylinder 18c, having the relatively smaller diameter, may be disposed in the top position (e.g., generally vertically above the first cylinder 14c, having a larger diameter). In some situations, such a configuration may facilitate lubrication of the crankshaft and pistons (e.g., in an engine configuration having a generally vertical crankshaft). However, in other implementations the relatively smaller cylinder may be disposed in the bottom position (e.g., generally below the relatively larger diameter cylinder). Additionally, while the first cylinder 14c and the second cylinder 18c are shown having a generally parallel, in-line configuration, this is intended for the purpose of illustration, and not of limitation. In particular, it will be appreciated that an internal combustion engine having two, or more, cylinders may include cylinders arranged in an offset configuration, as generally shown and described with respect to the illustrated embodiment of FIGS. 5 through 8.

As generally described above, the crankshaft may be coupled with the first piston and the second piston for rotation of the crankshaft associated with reciprocating movement of the first piston and/or the second piston. In particular, in some implementations, rotation of the crankshaft may result in reciprocating movement of the first piston and/or the second piston. Correspondingly, reciprocating movement of the first piston and/or the second piston may result in rotation of the crankshaft. As discussed above, during operation of an internal combustion engine consistent with the present disclosure, both modes of movement may be implicated during different operating cycles of the internal combustion engine (e.g., rotation of the crankshaft may drive reciprocating movement of one or more of the pistons, and an induced reciprocating movement of one or more of the pistons may drive rotation of the crankshaft). Consistent with the present disclosure, one, or both, of the pistons may be associated with the crankshaft for respective movement thereof in a variety of manners.

Figure 7:
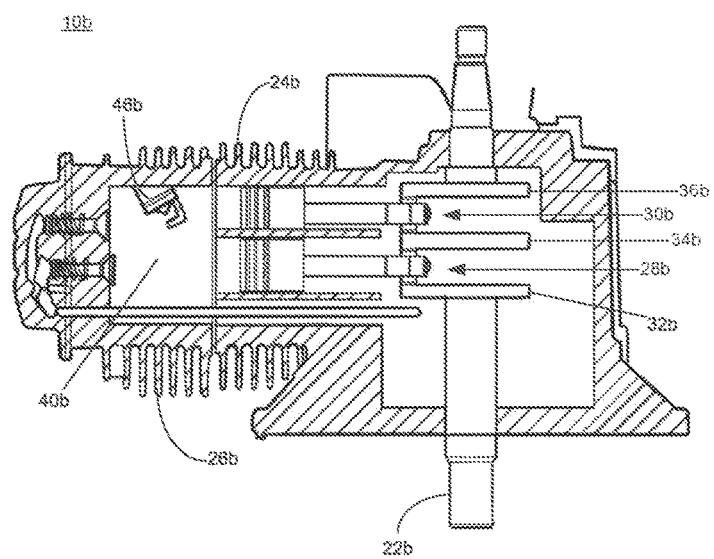
Figure 8:
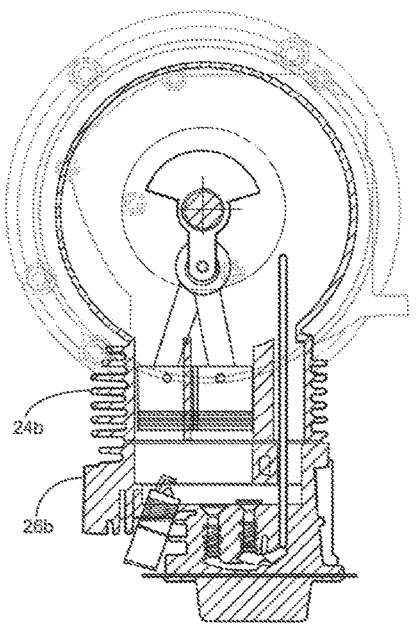
Figure 9:
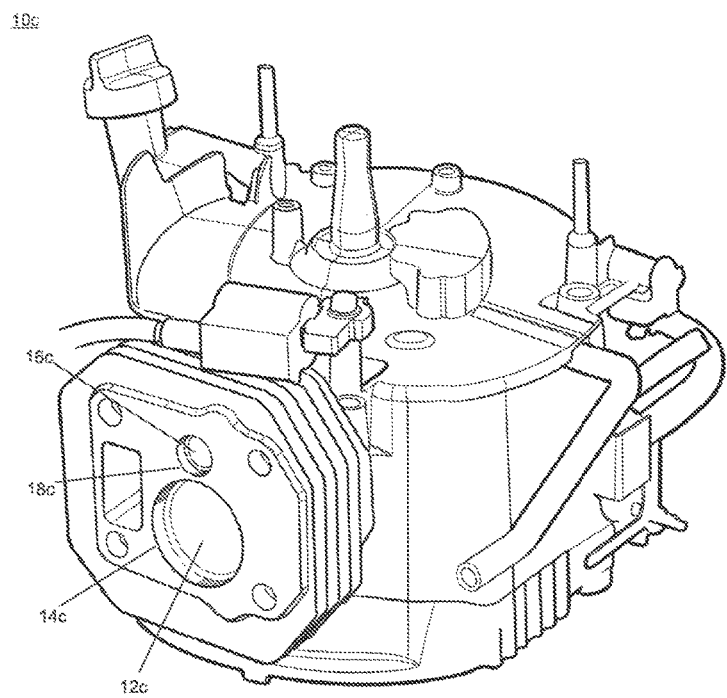
FIGS. 9 through 12 depict another illustrative example embodiment of a multiple cylinder internal combustion engine including multiple fired cylinders, according to an example implementation.
Figure 10:
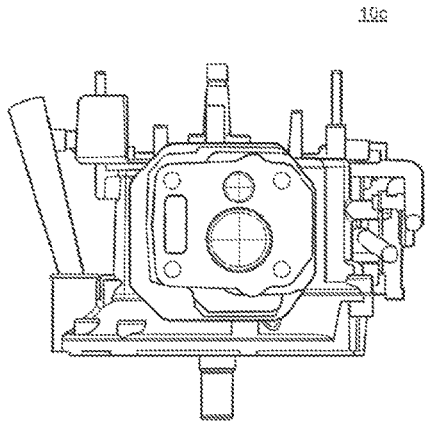
Figure 11:
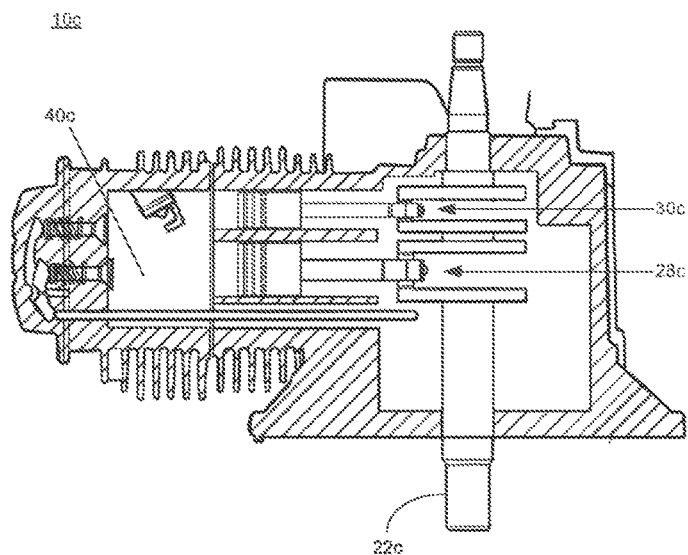
Figure 12:
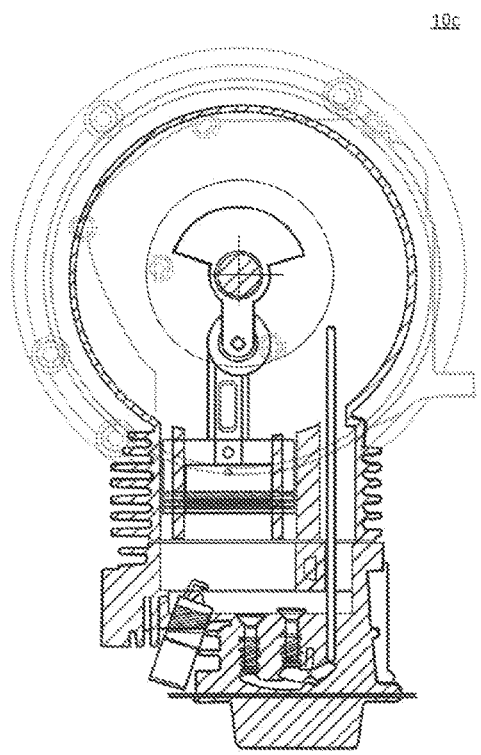

Consistent with an example embodiment, the crankshaft may be coupled with the first piston via a first crank journal and may be coupled with the second piston via a second crank journal. It will be understood that crank journals may generally refer to portion of the crankshaft that is offset from the centerline of the crankshaft and is configured to be coupled with a connecting rod for rotation of the crankshaft associated with reciprocating movement of the piston connected with the connecting rod. Crank journals may also be referred to as crank pins. Example arrangements including a crankshaft coupled with a first piston via a first crank journal and coupled with a second piston via a second crank journal are depicted, e.g., in FIGS. 7 and 11, with respect to the illustrated example internal combustion engine 10b and the illustrated example internal combustion engine 10c. As shown, for example, in FIG. 7, the crankshaft 22b may generally include a first crank journal 28b and a second crank journal 30b. The first piston 12b may be coupled with the crankshaft 22b via the first crank journal 28b and the second piston 16b may be coupled with the crankshaft 22b via the second crank journal 30b. Similarly, as shown in FIG. 11 with respect to the illustrated example internal combustion engine 10c, the crankshaft 22c may include a first crank journal 28c and a second crank journal 30c. The first piston 12c may be coupled with the crankshaft via the first crank journal 28c, and the second piston 16c may be coupled with the crankshaft 22c via the second crank journal. Consistent with some such embodiments, a crankshaft including two crank journals may also include a counterweight between at least the first crank journal and the second crank journal. For example, as shown in FIG. 7, the crankshaft 22b may include three counterweights, 32b, 34b, 36b, in which counterweight 34b may be disposed between the first crank journal 26b and the second crank journal 28b.

In an example embodiment consistent with the present disclosure, the crankshaft may be coupled with the first piston and the second piston via a first crank journal. For example, and referring to the illustrated example, internal combustion engine 10a shown in FIG. 3 includes the crankshaft 22a, which includes a single crank journal (i.e., first crank journal 28a). As shown, the first piston 12a and the second piston 16a are both coupled to the crankshaft 22a via the first crank journal 28a. Further, as shown, the crankshaft 22a include counterweight 32a on the outside of the connection to the first piston 12a and counterweight 36a on the outside of the connection to the second piston 16a, without a counterweight being disposed between the connections to the two pistons. It will be appreciated that, as shown, the crankshaft includes only a single crank journal, or crank pin. However, in some implementations it may not be necessary to finish the entirety of the single crank journal to a bearing finish (such as a highly polished and/or exactingly high round tolerance). For example, the region associated with the connection to the first piston and the region associated with the connection to the second piston may be finished to a bearing finish, while the region of the crank journal in between these two connection points may be less well finished.

As generally discussed above, the first piston and the second piston may be arranged in a variety of configurations (such as parallel, in-line, and offset), and the first piston and the second piston may be coupled with the crankshaft in a variety of configurations (e.g., each of the pistons coupled to separate respective crank journals, and both of the pistons coupled to the same, single crank journal). Accordingly, it will be appreciate that a variety of connecting rod configurations may be utilized. As is generally known, a connecting rod may provide the physical connection between a piston and a crank journal of the crankshaft. With additional reference to FIGS. 13 through 17, a variety of example crankshaft and connecting rod configurations are shown.

Figure 13:
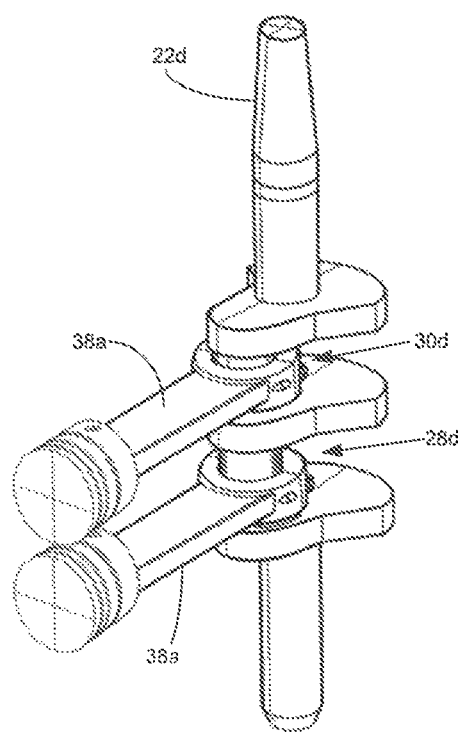
FIGS. 13 through 17 depict a variety of piston connecting rod configurations for a multiple cylinder internal combustion engine, according to a variety of example implementations.
Figure 14:
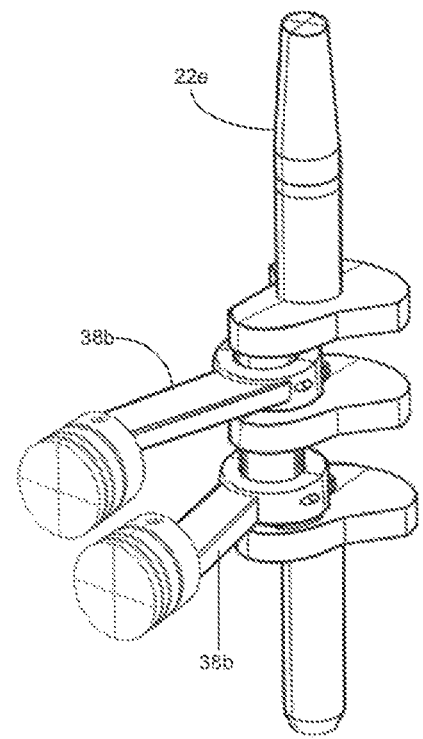

Referring to FIGS. 13 and 14, two illustrative example crankshaft and connecting rod configurations are depicted including a first crank journal and a second crank journal. As depicted in FIG. 13, according to an example implementation, the crankshaft 22d may include a first crank journal 28d and a second crank journal 30d. The crankshaft may be coupled to two pistons using generally straight connecting rods 38a. Referring also to FIG. 14, in another illustrative example embodiment, a crankshaft 22e is shown including a first and a second crank journal. As shown, the crankshaft may be coupled to two respective pistons via connecting rods 38b, in which the connecting rods may have the same configuration with one being flipped 180 degrees relative to the other. As shown, the connecting rods 38b may include an in-plane bend, or cock, adjacent the pistons. In some implementations, such a configuration may facilitate an offset cylinder configuration.

Figure 15:
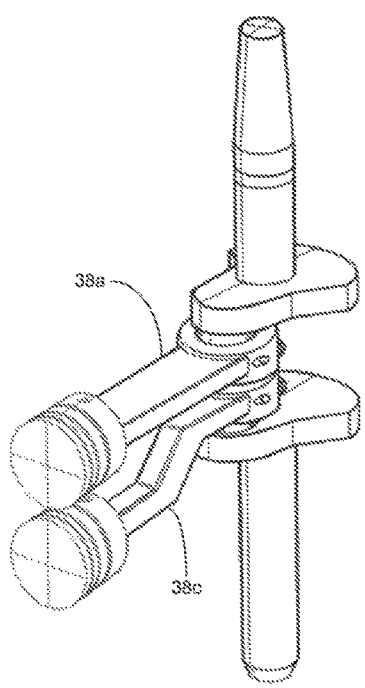
Figure 16:
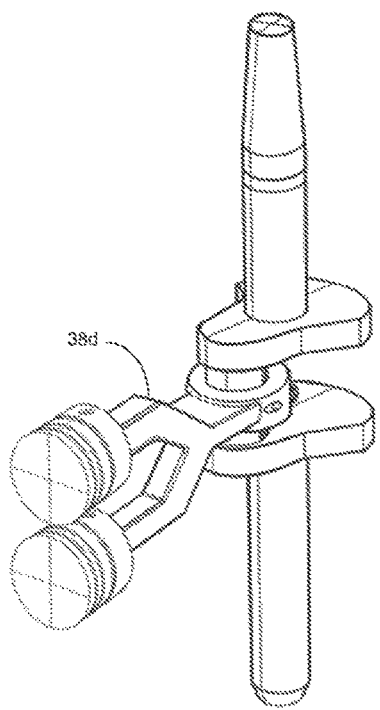
Figure 17:
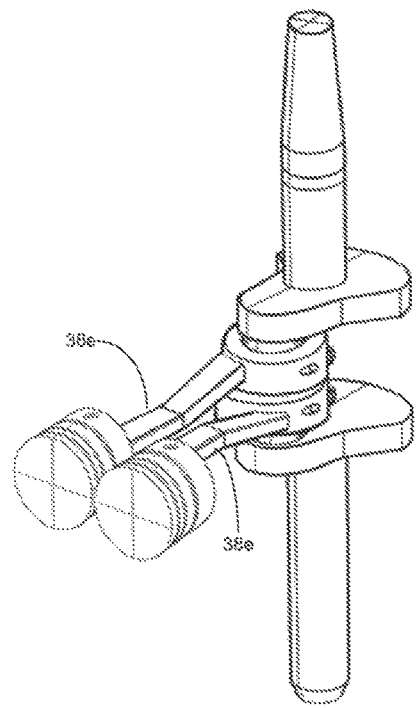

Referring to FIGS. 15 through 17 a variety of illustrative example crankshaft and connecting rod configurations are depicted through which two pistons may be coupled to the crankshaft by way of single crank journal. While the depicted illustrated embodiments depict pistons having a generally similar diameter, as discussed above, in some implementations the pistons may have different diameters. It will be appreciated that the depicted connecting rod configurations may be adapted to accommodate a variety of piston diameters and relative differences in diameters. As previously discussed with respect to FIG. 3, in one implementation, the crankshaft 22a may include a generally elongated crank journal 28a. Consistent with the illustrated example configuration, the first piston 12a and the second piston 16a may be coupled to the crank journal 28a via generally conventionally configured, straight connecting rods. Consistent with such an implementation, the crank journal may be sufficiently long to span enough of the first cylinder 14a and the second cylinder 18a to provide a connecting rod bearing surface generally in the region of the central axis of the first piston 12a and the second piston 16a.

With additional reference to FIGS. 15 through 17, various additional connecting rod configurations are depicted that may suitably couple two pistons to a single crank journal. For example, in the illustrated example embodiment of FIG. 15, a configuration is depicted in which one of the pistons may be coupled with the crankshaft using a generally straight connecting rod 38a. Additionally, the other of the pistons may be coupled with the crankshaft (via the same crank journal) by way of an offset connecting rod 38c. As shown, the offset connecting rod 38c may laterally offset away from the connecting rod 38a. Accordingly, the offset connecting rod 38c may increasing the spacing between the two pistons, e.g., to provide sufficient clearance between the two pistons to allow for reciprocating movement of the two pistons in respective associated cylinders. Referring to FIG. 16, in a further illustrative example embodiment, two pistons may be coupled with a crankshaft via a single crank journal by a single forked connecting rod 38d. As shown, the forked connecting rod 38d may include a single bearing for coupling with the crank journal, and may be forked to allow the connecting rod to be connected to two separate pistons. As shown, the arms of the forked connecting rod may be sufficiently laterally offset from one another to accommodate the two pistons (e.g., the fitment of both pistons to the connecting rod, and/or reciprocating movement of the pistons in respective cylinders). While the illustrated example forked connecting rod 38d is shown as being generally symmetrical, e.g., with each fork of the connecting rod being laterally offset by a generally similar amount, it will be appreciated that in other implementations the two forks may be asymmetrical, e.g., with one fork being laterally offset to a greater degree compared to the other fork. In a further embodiment, one fork of the connecting rod may be generally straight, and only one fork of the connecting rod may be laterally offset to provide sufficient clearance for coupling with two pistons.

Referring also to FIG. 17, according to yet another illustrative example embodiment, two pistons may be connected to a single crank journal of a crankshaft via two separate skewed connecting rods 38e. Consistent with the depicted embodiment, the two skewed connecting rods 38e may have a generally similar configuration, with one of the connecting rods being flipped 180 degrees. Consistent with the illustrated example embodiment the skewed connecting rods 38e may each be at least partially skewed inwardly toward one another, e.g., to provide an offset configuration of the pistons relative to one another.

While several illustrative example embodiments of crankshaft and connecting rod arrangements for coupling the pistons with the crankshaft, it will be appreciated that a wide variety of additional and/or alternative configurations may equally by utilized. As such, the present disclosure should not be limited to the depicted example configurations.

As generally discussed above, an internal combustion engine consistent with the present disclosure may include a combustion chamber that may be fluidly coupled with the first cylinder and the second cylinder. As also generally discussed, the combustion chamber may be fluidly coupled with the first cylinder and the second cylinder such that the first cylinder may be at least partially fluidly coupled with the second cylinder. In some implementations, the combustion chamber may at least partially enclose the distal end of the first cylinder and/or of the second cylinder. In some particular embodiments, the combustion chamber may overlie at least a portion of the distal end of the first cylinder and/or of the second cylinder.

In an illustrative example embodiment consistent with the present disclosure, the combustion chamber may include a cavity overlying at least a portion of the first cylinder and at least a portion of the second cylinder. For example, and referring to the illustrated example embodiment shown in FIG. 7, the internal combustion engine 10b may include a combustion chamber 40b, which may be disposed at the distal end of the first cylinder 14b and the second cylinder 18b. Further, as shown, the combustion chamber 40b may overlie and at least partially, and/or fully, enclose the first cylinder 14b and the second cylinder 18. In some embodiments, as shown in the illustrated example embodiment, the combustion chamber may include a cavity that may be formed in the cylinder head 26b of the internal combustion engine 10, e.g., which may bolted, or otherwise coupled with, the engine block 24b. In some implementations, at maximum reciprocating movement of the pistons (e.g., at top-dead-center of the crankshaft rotation), the pistons may be adjacent to the distal end of the first cylinder 14b and the second cylinder 18b. Accordingly, the substantial majority and/or the entirety of a fuel-air mixture drawn into the engine may be compressed within the combustion chamber 40b.

Figure 18:
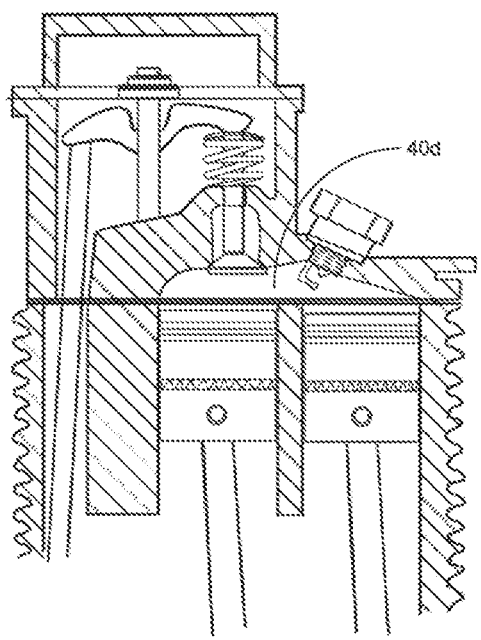
FIG. 18 depicts an illustrative example combustion chamber configuration that may be used in connection with a multiple cylinder internal combustion engine including multiple fired cylinders, according to an example implementation.

Consistent with some implementations, the combustion chamber may be generally symmetrical over the first cylinder and the second cylinder. For example, as generally shown in FIG. 7, the combustion chamber 40b may include a first cavity that may generally overlie at least a portion of the first cylinder and at least a portion of the second cylinder. Further, in some embodiments, the combustion chamber may overlie the substantial majority of the first cylinder 14a and the second cylinder 18a, and may form a cavity over the distal end of the first cylinder and the second cylinder. While the combustion chamber 40b is shown having a generally rectangular configuration, it will be appreciated that the geometry of the combustion chamber may vary. For example, the combustion chamber may have a generally rounded shape, for example, a generally elliptical or hemispherical shape, e.g., including rounded and/or smoothly contoured corners. Further, as shown, for example in the illustrated example embodiment of FIG. 18, the combustion chamber may be asymmetrical over the first cylinder and the second cylinder. In some such embodiments, the combustion chamber may define different relative depths, or volumes, in the region overlying the first cylinder relative to the region overlying the second cylinder.

In some embodiments consistent with the present disclosure, the combustion chamber may include a first cavity portion at least partially overlying at least a portion of the first cylinder, and a second cavity portion at least partially overlying at least a portion of the second cylinder. For example, and referring to the illustrative example embodiment shown in FIG. 3, the combustion chamber 40a may define a first cavity 42 generally overlying the first cylinder 14a and may define a second cavity 44 generally overlying the second cylinder 18a. As shown, the first cavity 42 and the second cavity 44 may be at least partially separated from one another. Further, in some such embodiments, the first cavity and the second cavity may be in fluid communication with one another. For example, in some embodiments the separation between the first cavity and the second cavity may not fully extend to the engine block, thereby providing at least partial fluid communication between the first cavity and the second cavity. Further, in some embodiments consistent with the present disclosure, the first cavity and the second cavity may be in fluid communication with one another in the region of one or more of an intake valve and an exhaust valve. Consistent with the foregoing example, in which the combustion chamber may generally include a first cavity and a second cavity, fluid communication between the first cavity and the second cavity may one or more of facilitate flow of a fuel-air mixture into both the first cavity and the second cavity via an intake valve, facilitate propagation of combustion of a fuel-air mixture throughout the first cavity and the second cavity and/or facilitate propagation of combustion of the fuel-air mixture from the first cavity to the second cavity, and/or facilitate flow of combustion products from the first cavity and the second cavity out through an exhaust valve.

Consistent with some embodiments of the present disclosure, an ignition source may be at least partially disposed within the combustion chamber. For example, as shown in FIG. 3, the ignition source may include a spark plug 46a, which may be at least partially disposed within the combustion chamber 40a to ignite a fuel-air mixture within the combustion chamber. In some embodiments, the spark plug may protrude into the combustion chamber. In some embodiments, the spark plug may be at least partially disposed in a recess in a wall of the combustion chamber, which may provide fluid communication between the combustion chamber and the spark plug, e.g., to allow the spark plug to ignite a fuel-air mixture within the combustion chamber. Consistent with some illustrative example embodiments, the internal combustion engine may include a single spark plug which may ignite a fuel-air mixture within the combustion chamber.

Referring to the illustrative example embodiment shown in FIG. 7, the internal combustion engine 10b may include a single spark plug 46b for igniting a fuel-air mixture within the combustion chamber 40b. When the spark plug 46b ignites a fuel-air mixture within the combustion chamber 40b, the combustion may propagate from the point of ignition throughout the entire combustion chamber. Further, consistent with an implementation in which the combustion chamber may include a first cavity associated with the first cylinder and a second cavity associated with the second cylinder, (e.g., as shown in the illustrative example embodiment depicted in FIG. 3) the fluid communication between the first cavity (e.g., cavity 42) and the second cavity (e.g., cavity 44) may allow the combustion process to propagate between the two cavities. As such, in an implementation including a single spark plug (e.g., which may be associated with only one cavity) a fuel-air mixture in the combustion chamber (i.e., in both cavities) may be ignited and/or ignition of the fuel-air mixture may propagate through both cavities.

Further, in some illustrative example embodiments, an internal combustion engine may include two ignition sources. For example, a first ignition source (e.g., a spark plug) may be generally associated with the first cylinder, and a second ignition source (e.g., a spark plug) may be generally associated with the second cylinder. In some such embodiments, the inclusion of multiple ignition sources may facilitate rapid ignition of a fuel-air mixture and/or may facilitate complete and/or rapid combustion of the fuel-air mixture. With reference to the illustrative example embodiment shown in FIG. 3, in some embodiments, e.g., in which the combustion chamber 40a may include a first cavity 42 and a second cavity 44, the internal combustion engine 10a may include a first ignition source 46a associated with one of the cavities (e.g., the second cavity 44 in the depicted embodiment) and a second ignition source 48 associated the another of the cavities (e.g., the first cavity 42 in the depicted embodiment). Consistent with some such embodiments, and as generally discussed above, the inclusion of two ignition sources may facilitate rapid and/or complete combustion of a fuel-air mixture within the combustion chamber (e.g., which may be at least partially separated into a first cavity and a second cavity).

As generally described above, an internal combustion engine consistent with the present disclosure may include an intake valve (and/or more than one intake valve) that may provide selective fluid communication between an intake system and the combustion chamber. For example, the intake valve may be in fluid communication with the combustion chamber (e.g., which may include fluid communication with a first cavity and a second cavity of the combustion chamber in an implementation include multiple combustion chamber cavities, as generally described above) and/or with both of the first cylinder and the second cylinder. In general, the intake system may include one or more of a source of fuel and a source of air, and may, at least in part, facilitate mixing and or atomizing of the fuel within the air. Examples of an intake system may include, but are not limited to, a carburetor, a fuel injection system, an intake runner, and intake manifold, and the like. Consistent with some such embodiments, a fuel air mixture, e.g., provided by a carburetor, may enter the combustion chamber via the intake valve (or more than one intake valve). As is generally known, selective fluid communication between the intake system and the combustion chamber may be accomplished by opening the intake valve, for example, at least during an intake cycle of the internal combustion engine to charge one or more of the cylinders and/or the combustion chamber with a fuel-air mixture.

Similarly, and as generally described above, an internal combustion engine consistent with the present disclosure may also include an exhaust valve (and/or more than one exhaust valve) that may provide selective fluid communication between an exhaust system and the combustion chamber. For example, the exhaust valve may be in fluid communication with the combustion chamber (e.g., which may include fluid communication with a first cavity and a second cavity of the combustion chamber in an implementation include multiple combustion chamber cavities, as generally described above) and/or with both of the first cylinder and the second cylinder. In general, the exhaust system may include, e.g., an exhaust runner, an exhaust manifold, a muffler, and/or one or more emissions control devices (such as an exhaust gas recirculation system, a catalytic converter, etc.). The exhaust system may, generally, allow for the evacuation of combustion products of a fuel-air mixture from one or more of the combustion chamber (including a first and second combustion chamber cavity in implementations including multiple combustion chamber cavities), the first cylinder and/or the second cylinder. Selective fluid communication between the exhaust system and the combustion chamber (and/or the first cylinder and the second cylinder) may be provided by opening the exhaust valve, e.g., during at least the exhaust cycle of the internal combustion engine.

Consistent with the present disclosure a wide variety of intake and exhaust valve arrangements may be implemented relative to the cylinder arrangements. For example, and generally referring to FIGS. 19 through 23, some non-limiting examples of valve and cylinder arrangements are schematically depicted. Consistent with the schematically depicted valve arrangements, the centerline 50 of the crankshaft extends vertically in the drawings. As will be discussed in greater detail below, the intake and exhaust valves may be configured in an overhead valve arrangement (e.g., in which the intake and exhaust valves are at least partially disposed in the cylinder head and may open and close ports in the combustion chamber), and/or may be configured in a flathead valve arrangement (e.g., in which the intake and exhaust valves may be at least partially disposed in the engine block and may open and close ports in the engine block). Accordingly, it will be understood that the schematically depicted valve arrangements may be equally applicable to flathead engine configurations and overhead valve configurations. Further, it will be appreciated that, particularly with regard to overhead valve configurations, the schematically depicted valves may at least partially overlie one or more of the first cylinder and the second cylinder. Additionally, it will be appreciated that, while the various schematically depicted valve arrangements are shown in the context of a first cylinder and a second cylinder having generally similar diameters, the schematically depicted valve arrangements are equally applicable to internal combustion engine embodiments in which the first cylinder may have a diameter that is different that the diameter of the second cylinder.

Figure 19:
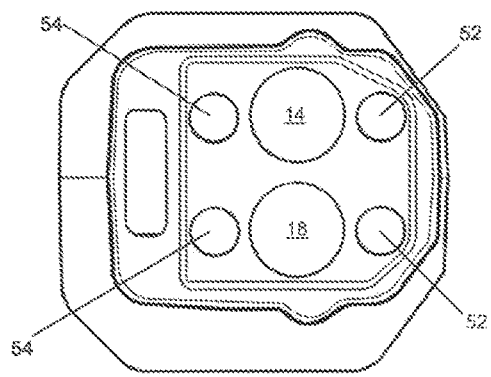
FIGS. 19 through 23 schematically depict a variety of cylinder and valve arrangements that may be used in connection with an internal combustion engine having multiple fired cylinders, according to a variety of example implementations.

Referring to FIG. 19, and illustrative example of a four valve configuration is shown for an internal combustion engine having a parallel, in-line cylinder configuration. As shown, the valves may generally be configured having two intake valves 52 and two exhaust valves 54 generally arranged on opposed sides of the cylinders 14, 18. Further, as generally shown, each cylinder may include a respective intake valve and exhaust valve laterally opposed the approximate centerline of each respective cylinder.

Figure 20:
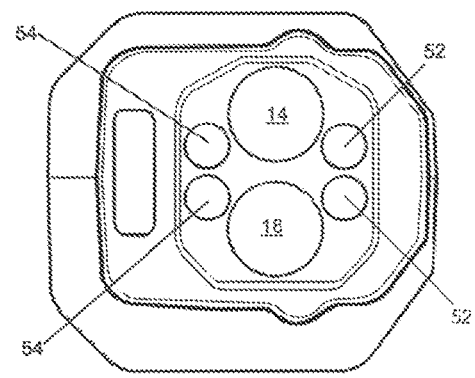

With reference to FIG. 20, another illustrative example embodiment of a four valve configuration is shown for an internal combustion engine having a parallel, in-line cylinder configuration. As shown, the valves may generally be configured having two intake valves 52 and two exhaust valves 54 disposed on either side of the cylinders 14, 18. Consistent with the illustrative example embodiment, the valves may generally be disposed around the division between the two cylinders 14, 18.

Figure 21:
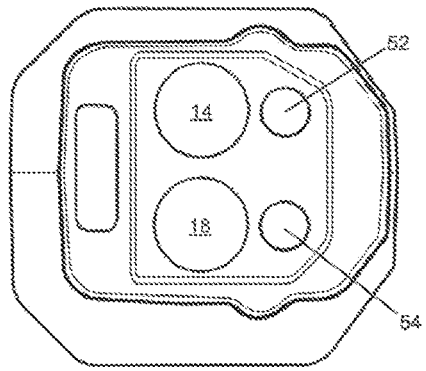

Referring to FIG. 21, an illustrative example embodiment of a two valve configuration is shown for an internal combustion engine having a parallel, in-line cylinder configuration is shown. In the depicted example embodiment, the intake and exhaust valves 52, 54 may be disposed on the same side of the cylinders. While in the depicted example embodiment the intake and exhaust valves are shown generally aligned with the transvers centerlines of the two cylinders (e.g., relative to the centerline 50 of the crankshaft), in other configurations, the intake and exhaust valves may be more closely placed to one another, for example, in the region of the separation between the cylinders, similar to the configuration of either the intakes valves or the exhaust valves depicted in the example embodiment of FIG. 20.

Figure 22:
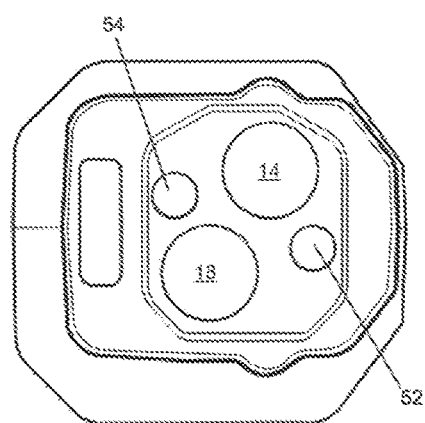

Referring to FIG. 22, an illustrative example embodiment of a two valve configuration is shown for an internal combustion engine having an offset valve cylinder arrangement (i.e., a cylinder arrangement in which the vertical centerlines of the two cylinders are respectively offset to either side of the centerline 50 of the crankshaft). As shown, the intake valve 52 and the exhaust valve may be offset relative to one another along the centerline 50 of the crankshaft in the "pockets" between the two cylinders. It will be appreciated that in some implementations the intake and exhaust valves may be more closed placed toward the centerline 50 of the crankshaft.

Figure 23:
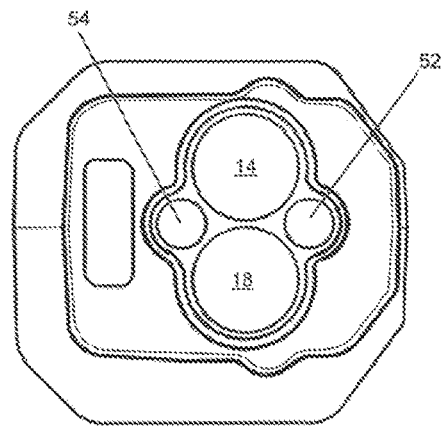

Referring to FIG. 23, an illustrative example embodiment of a two valve configuration is shown for an internal combustion engine having a parallel, in-line cylinder configuration. Consistent with the depicted configuration, the intake and exhaust valves may be generally in line with one another, transverse to the centerline 50 of the crankshaft, and the centerline between the intake and exhaust valves may generally be centered between the two cylinders 14, 18. In some implementations, such a configuration may provide a reduced lateral spread of the valves and/or may provide for a relatively smaller combustion chamber footprint (i.e., the plan view area of the combustion chamber at the interface between the cylinder head and the engine block).

Figure 4:
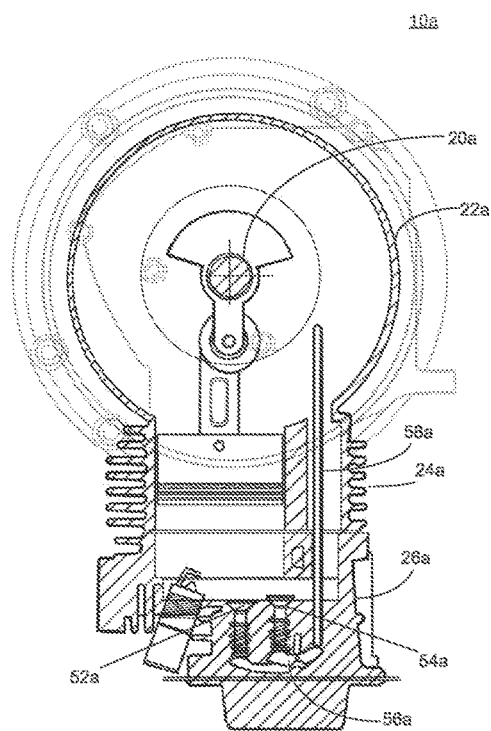
Figure 5:
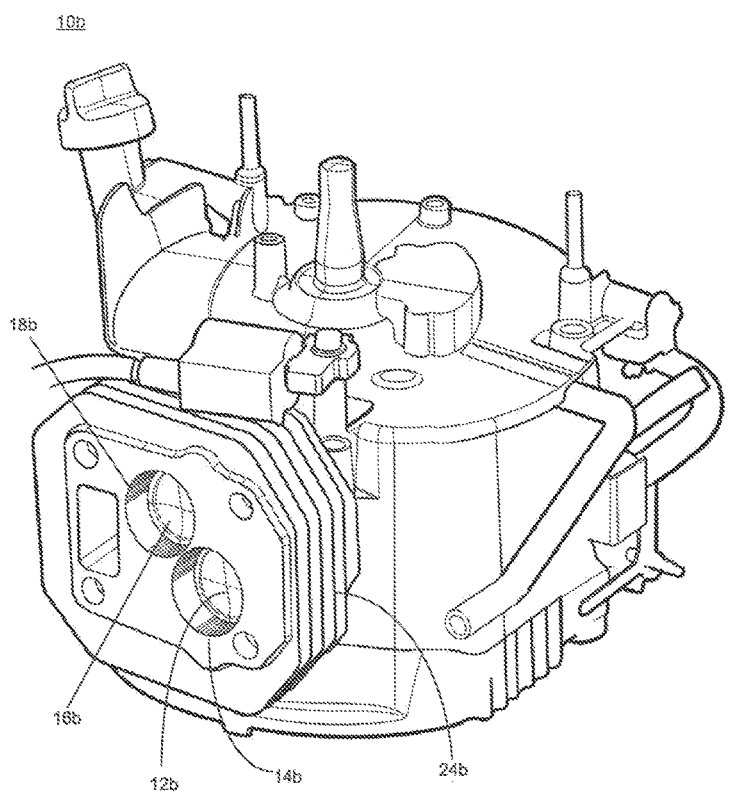
FIG. 5 through 8 depict another illustrative example embodiment of a multiple cylinder internal combustion engine including multiple fired cylinders, according to an example implementation.
Figure 6:
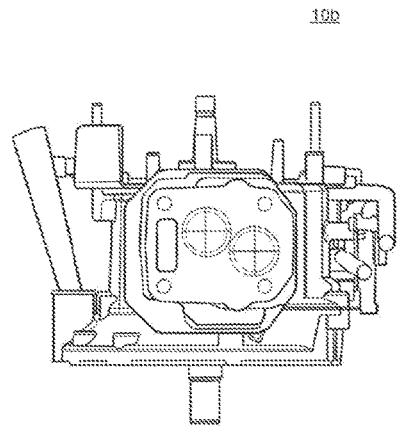

As generally discussed above, consistent with various embodiments of the present disclosure, an internal combustion engine may be provided that may include intake and exhaust valves arranged in an overhead valve arrangement. For example, as generally shown in the illustrative example embodiments of FIGS. 3-4, 7-8, 11-12, and 18, the intake and exhaust valves may generally be disposed within the cylinder head, and may be actuated by way of a pushrod acting on a rocker assembly. For example, as shown in FIG. 4, an intake valve 52a and exhaust valve 54a may be disposed in the cylinder head 26a. The intake valve 52a, for example, may be actuated by a rocker 56a, which may in turn be actuated by a pushrod 58a that is actuated by a cam (not shown), directly or indirectly by the crankshaft 20a (thereby ensuring desired valve timing relative to piston movement). Accordingly, when the cam acts on the pushrod 58a, the pushrod 58a may actuate the rocker 56a, which may actuate the intake valve 52, causing the valve to open (and subsequently close, based on the cam profile and the rotation of the cam). A corresponding arrangement may be implemented for actuating (e.g., opening and closing) the exhaust valve. Consistent with such an embodiment, the pushrods (e.g., push 58a) may extend through rod galley 60a, extending through the engine block 24a and to the cylinder head 26a.

Consistent with some embodiments of the present disclosure, the intake valve and the exhaust valve may be arranged in a flathead configuration. Consistent with such an embodiment, rather than being disposed in the cylinder head, and opening and closing ports in the cylinder head and/or combustion chamber, the intake valve(s) and exhaust valve(s) may be disposed in the engine block, and may open and close intake and exhaust ports at least partially disposed in the engine block. Consistent with such an implementation, the combustion chamber may at least partially overlie the intake and exhaust valves, e.g., to provide opening clearances and to provide fluid communication between the valves and the combustion chamber and/or one or more of the first cylinder and the second cylinder. For example, and referring also to FIG. 24, an illustrative example embodiment of an internal combustion engine 10d is schematically shown including a flathead configuration. As shown in the depicted illustrative embodiment, the internal combustion engine 10d may include an engine block 24d including a first cylinder 14d and a second cylinder 18d, including respectively associated pistons (12d, 16d). The engine block 24d may further include a port (such as an intake port 62d, which may provide fluid communication with the intake system) and a valve (such an intake valve 52d). As shown, the cylinder head 26d may include a combustion chamber 40d, which may at least partially overlie the intake valve 52d and at least partially overlie the first cylinder 14d and the second cylinder 18d, thereby providing opening clearance for the intake valve 52d and provide selective fluid communication between the intake system (via the intake port 62d) and the combustion chamber 40d. Selective opening and closing of the intake valve 52d may be accomplished via a cam (not shown) that is directly, or indirectly, driven by the crankshaft acting on the stem of the valve. It will be appreciated that a similar arrangement may be included for an exhaust valve to provide selective fluid communication between an exhaust system and the combustion chamber.

Figure 24:
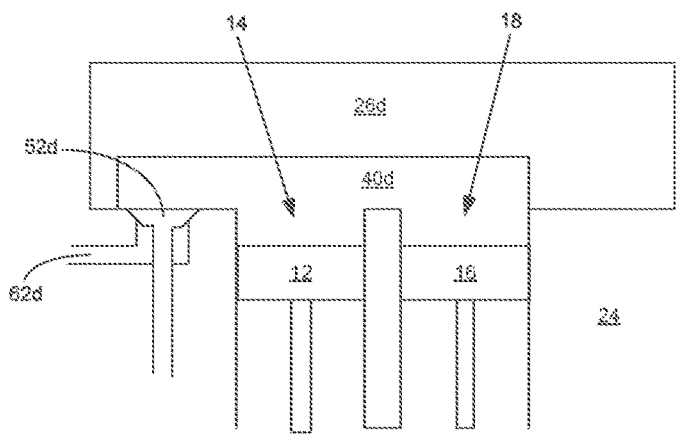
FIG. 24 schematically depicts a portion of a flathead internal combustion engine including multiple fired cylinders; according to an example implementation.

As generally discussed above, the valves may be actuated by a cam (either directly acting on a valve stem and/or indirectly via a pushrod and rocker assembly), which may be directly or indirectly driven by the crankshaft to provide selective opening and closing of the valves in coordination with the reciprocating movement of the pistons. Consistent with the present disclosure a variety of valve actuation arrangements may be utilized for selectively opening and closing the valves. FIGS. 25 through 33 depict a variety of non-limiting illustrative example implementations of valve actuation arrangements that may be utilized in connection with the present disclosure. In the depicted illustrative example implementations, direct valve actuation arrangements are shown, in which the valve is directly actuated by pushing against a valve stem. Such an arrangement may typically be utilized in connection with flathead valve arrangements (e.g., as shown in FIG. 24). It will be appreciated however, that such configurations may equally be utilized in connection with overhead valve arrangements, in which, rather than acting on a valve stem, the cam(s) may act on a pushrod, which may in turn act on a rocker assembly that may actuate the valve, as is generally shown, e.g., in 3-4, 7-8, 11-12, and 18. Accordingly, it will be understood that the illustrated example valve actuation arrangements may be utilized in connection with flathead engine configurations and in connection with overhead valve engine configurations.

Figure 25:
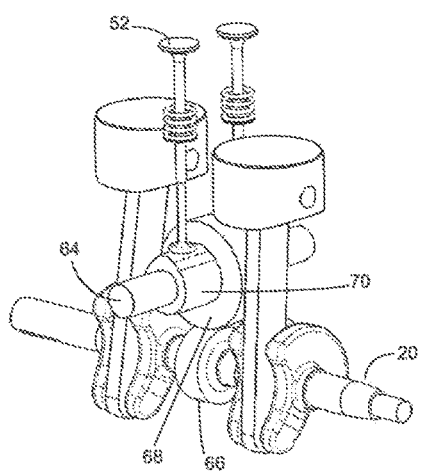
FIGS. 25 through 33 depicts a plurality of piston and valve arrangements that may be used in connection with an internal combustion engine including multiple fired cylinders; according to a variety of implementations.
Figure 27:
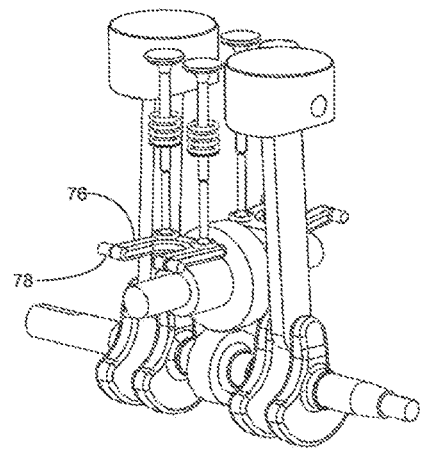
Figure 26:
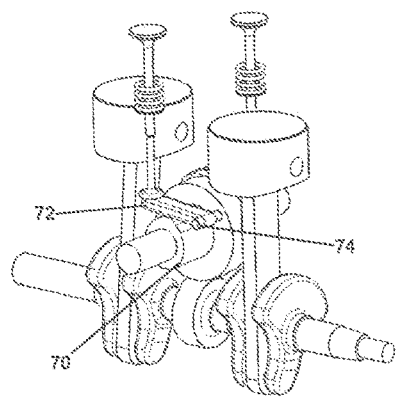
Figure 28:
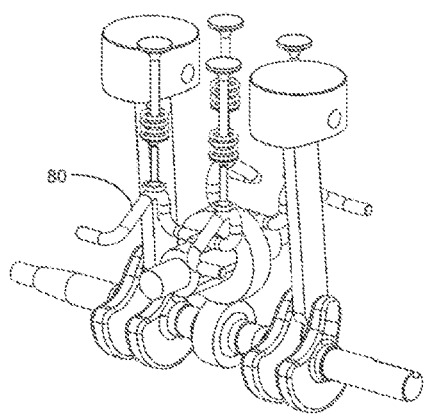

Referring to FIG. 25, an illustrative example embodiment of a direct actuation configuration is depicted, in which a camshaft 64 is oriented transversely to, and rotated by the crankshaft 20. In such a configuration, the camshaft 64 and the crankshaft 20 may include cooperating helical gears, which may allow for the transvers arrangement of the camshaft and the crankshaft, and may allow the camshaft to be rotated at have the rate of the crankshaft (e.g., to provide desired timing for the four cycle combustion process). A similar camshaft-crankshaft drive arrangement is also shown in FIGS. 26 through 28. As shown in FIG. 25, the intake and exhaust valves may be directly driven by respective cams (e.g., the stem of intake valve 52 may be driven by cam 70) to effectuate the desired opening and closing of the intake valve. A corresponding arrangement may be utilized for opening and closing the exhaust valve.

Referring to FIG. 26, an illustrative example embodiment of an indirect actuation configuration is depicted. Consistent with the depicted arrangement, the camshaft may be oriented transversely to the crankshaft, as generally described above. Rather than the cam acting directly on the valves (e.g., via the valve stems) an intermediate lever 72 may ride on the cam. The lever 72 may include a pivot 74, such that the lever 72 may ride on the cam 70, and may pivot in response to the rotation of the cam and the cam profile. Consistent with the example arrangement, it may be possible to laterally separate the valve (or pushrod) from the centerline of the camshaft. In some embodiments, the lever may provide mechanical advantage, e.g., to allow the cam to be lifted a greater or smaller degree than the lift provided by the cam profile.

Referring to FIG. 27, another illustrative example embodiment of an indirect actuation configuration is depicted. Similar to the previous example embodiment, the illustrated example embodiment of FIG. 27 may utilize a lever 76 including two arms, each having a respective pivot 78. Consistent with the illustrated configuration, the lever may be configured to actuate two valves (e.g., which may facilitate a four valve engine configuration with two valves being actuated off of a single cam). Additionally, as with the previous example embodiment, the lever arrangement may allow the valves or pushrods to be laterally displaced to either side of the camshaft centerline, and may provide mechanical advantage that may provide greater or smaller valve lift than provided by the cam profile.

Referring to FIG. 28, another illustrative example embodiment of an indirect actuation configuration is depicted. Similar to the previous illustrated example embodiment, a lever may be utilized for actuating two (or more) valves by a single cam. In the illustrated example embodiment, the lever may include a wire form 80, i.e., a wire that has been bent into the desired shape. In addition to the previously noted features, the use of a wire form indirect actuator may provide a relatively easily and/or inexpensively manufactured component. Additionally, in some embodiments, the wire form lever may provide some degree of elasticity and/or compliance, which may facilitate assembly (e.g., the wire form may be elastically deformed to allow the pivot arms to be inserted into corresponding pivot holes).

With reference to FIGS. 29 through 33, various valve actuation arrangements are depicted including single or double camshafts that are oriented parallel to the crankshaft. For example, as shown, the camshafts 82 may be oriented generally parallel to the crankshaft 20, and may be driven by the crankshaft via coopering gears 84, 86, belts, chains, etc. Consistent with the illustrated example embodiment of FIG. 29, the valves (or pushrods) may be indirectly actuated via a lever 88, as generally discussed above with respect to the transverse camshaft arrangements. It will be appreciated that the lever may have a similar configuration as any of the previously discussed levers and may provide similar features and advantages.

Figure 30:
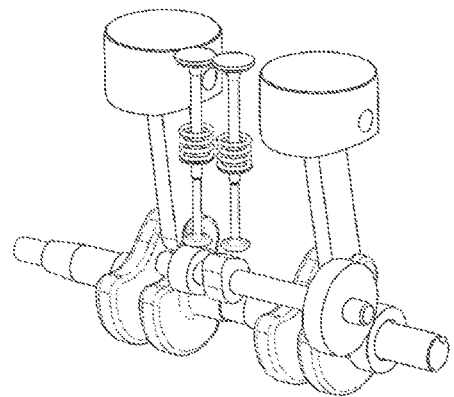
Figure 29:
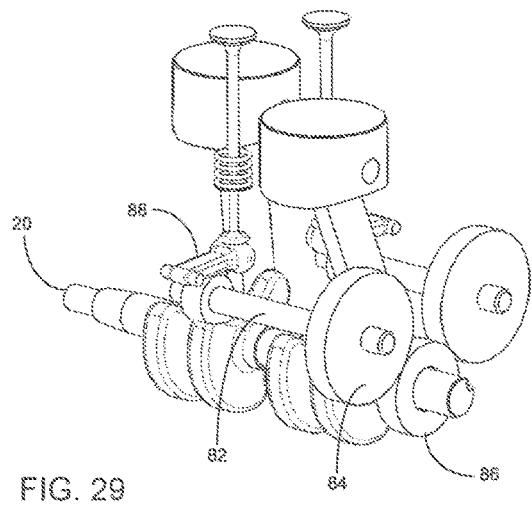
Figure 31:
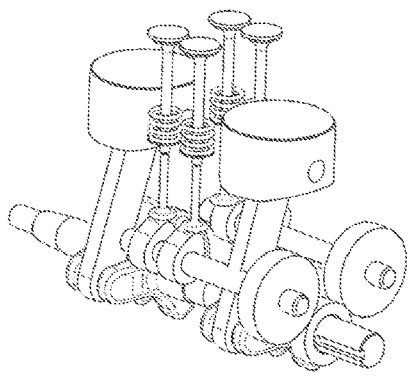
Figure 32:
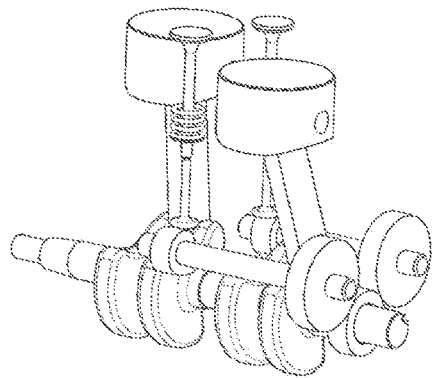
Figure 34:
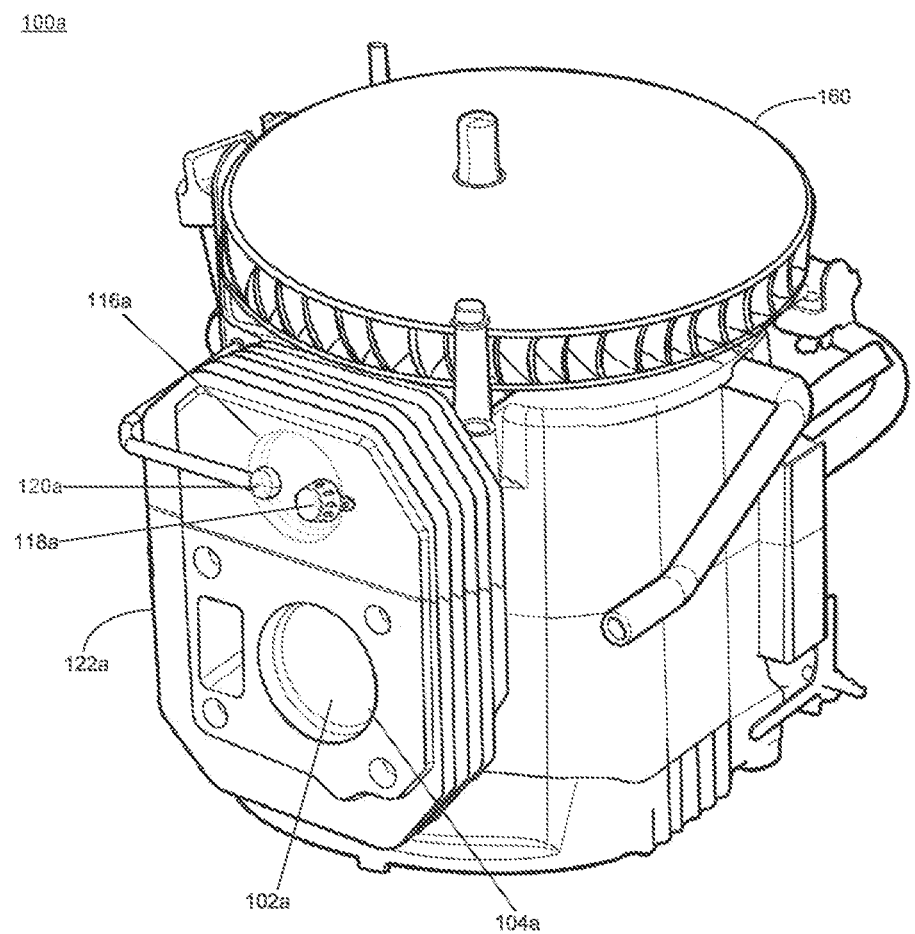
FIGS. 34 through 37 depict an illustrative example embodiment of a multiple cylinder internal combustion engine, according to an example implementation.
Figure 35:
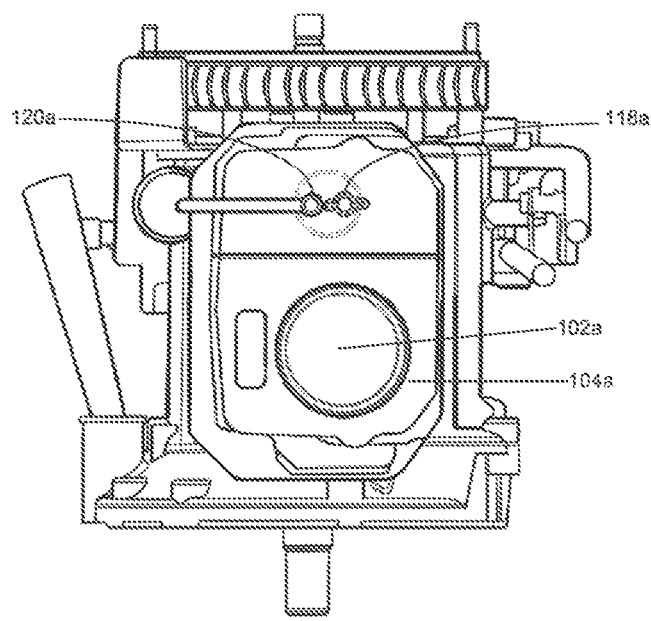
Figure 36:
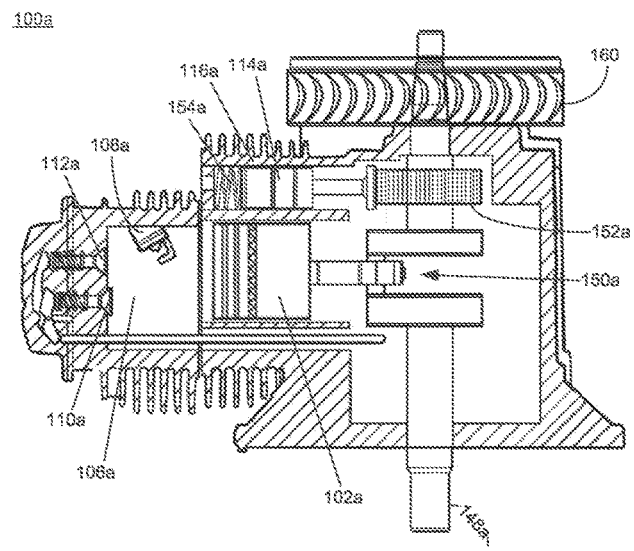

Referring to FIGS. 30 through 32, a variety of direct actuation configurations are depicted, wherein the valves (or pushrods) may be directly actuated by a cam disposed on camshafts oriented generally parallel to the crankshaft. For example, consistent with the embodiment shown in FIG. 30, a single camshaft may include two cams that may actuate respective valves. In the depicted embodiment, the two cams may have different profiles and/or different clocking, with one cam actuating an intake valve and the other cam actuating the exhaust valve. Consistent with the illustrated example embodiment of FIG. 31, two cam shafts may be utilized, one for actuating intake valves and one for actuating exhaust valves. As shown, each camshaft may include two cams for actuating two respective valves (i.e., the intake camshaft may actuate two intake valves and the exhaust camshaft may actuate two exhaust valves). With reference to FIG. 32, in a similar embodiment, two camshafts may be utilized, one for actuating an exhaust valve and one for actuating an intake valve. As shown, each camshaft may include a single cam for actuating a single valve, e.g., as may be utilized in a two valve internal combustion engine.

Figure 33:
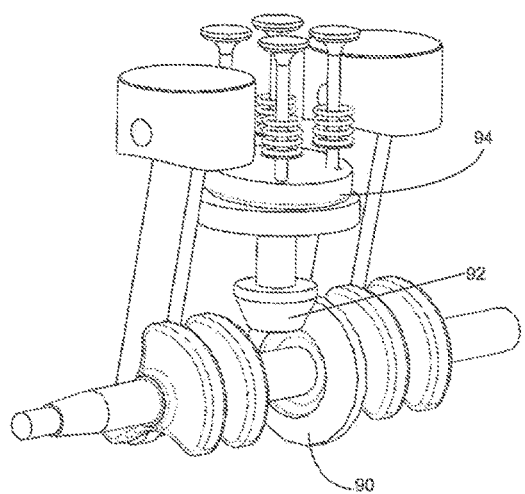

With reference to FIG. 33, an illustrative example embodiment of an axial cam arrangement is depicted. Consistent with the illustrated embodiment, a camshaft may be arranged generally perpendicular to the crankshaft, and may be driven by cooperating bevel gears 90, 92, spiral gears, or the like. As shown, the camshaft may be generally oriented in the intended direction of valve movement. The camshaft may include an axial cam, which may include a cam plate oriented generally perpendicularly to the axis of the camshaft. The cam plate may include a profiled face (e.g., that at least in part may be angled relative to the plane of rotation of the cam plate). As shown, the valves (or pushrods) may be radially displaced from the longitudinal axis of the camshaft. As the camshaft rotates the cam plate, the profiled face of the cam plate may cause the valves to lift and recede, thereby causing the opening and closing of the valves. As with a conventional cam, the profile of the cam about the contact surface between the cam plate and the valve stems (or pushrods) will control the lifting and closing of the valves.

While various examples of cam arrangements have been depicted, as noted above, a variety of additional and/or alternative configurations may be utilized. Further, as generally noted throughout, while the depicted embodiments relate to the actuation of the valves themselves, it will be understood the that the various cam arrangements may be utilized to actuate pushrods, which may actuate the valves, e.g., via rocker assemblies or other suitable arrangements.

As generally discussed above, consistent with some implementation, the present disclosure may provide a multiple cylinder internal combustion engine that may include one, or more than one, fired cylinders and respective piston(s) (i.e., a cylinder that may, at least in part, intake a fuel-air mixture, compress the fuel-air mixture, generate power through the combustion of the fuel-air mixture, and expel the combustion products of the fuel-air mixture). Additionally, in some implementations consistent with the present disclosure, the internal combustion engine may include one, or more than one, cylinders and respective piston(s) that may perform additional functions related to one or more aspects of the operation of the internal combustion engine. For example, in some embodiments, one, or more than one, cylinders and associated pistons may pressurize a fluid that may be selectively released to start the internal combustion engine and/or assist in starting the internal combustion engine.

Continuing with the foregoing, some embodiments consistent with the present disclosure may include an internal combustion engine (e.g., which may be a four stroke, air-cooled internal combustion engine, and/or another type of internal combustion engine, as previously described) that may include a first piston reciprocatingly disposed in a first cylinder, and a combustion chamber fluidly coupled with the first cylinder. The internal combustion engine may further include an ignition source that may be at least partially disposed within the combustion chamber. An intake valve may provide selective fluid communication between an intake system and the combustion chamber, and an exhaust valve may provide selective fluid communication between an exhaust system and the combustion chamber. A second piston may be reciprocatingly disposed within a second cylinder, wherein reciprocating movement of the second piston may draw a fluid into the second cylinder via a fluid inlet and may expel the fluid from the second cylinder via a fluid outlet. A pressure accumulator may be fluidly coupled with the fluid outlet of the second cylinder for receiving the fluid from the second cylinder and providing a reservoir of pressurized fluid. A crankshaft may be coupled with the first piston and the second piston for rotational motion associated with reciprocating movement of the first piston and the second piston.

For example, and referring also to FIGS. 34 through 37, and illustrative example embodiment of an internal combustion engine 100a is shown. As depicted the internal combustion engine 100a may include an air-cooled engine (e.g., including one or more cooling features such as cooling fins). As generally described in connection with preceding embodiments, the internal combustion engine may include a first piston 102a reciprocatingly disposed in a first cylinder 104a, and a combustion chamber 106a fluidly coupled with the first cylinder 104a. Consistent with the illustrated example embodiment, the first cylinder 104a may include a fired cylinder. Why the illustrated example embodiment is depicted including a single fired cylinder, it will be appreciated that the internal combustion engine may include more than one fired cylinder. Consistent with such embodiments, multiple fired cylinders may be configured in a manner of an internal combustion engine consistent with the principles and embodiments described above, and/or may be configured in the manner of any conventional multiple cylinder internal combustion engines. Additionally, the internal combustion engine 100a may include an ignition source 108a, which may be at least partially disposed within the combustion chamber 106a. Consistent with some example embodiments, the ignition source may include a spark plug.

Continuing with the illustrated example embodiment, the internal combustion engine may additionally include an intake valve 110a, which may provide selective fluid communication between an intake system (e.g., which may include one or more of a carburetor and/or a fuel injection system, an intake runner, and/or an intake manifold) and the combustion chamber 106a. Further, the internal combustion engine may include exhaust valve 112a, which may provide selective fluid communication between an exhaust system (e.g., which may include one or more of an exhaust runner, and exhaust manifold, and/or a muffler) and the combustion chamber 106a. Together, the intake valve and the exhaust valve may allow a fuel-air mixture to be drawn into the first cylinder and/or the combustion chamber, and to be compressed (e.g., by reciprocating movement of the first piston). The compressed fuel-air mixture may be ignited by the ignition source, which may reciprocatingly drive the first piston for generating power. Further the exhaust valve may allow the combustion products of the fuel-air mixture to be expelled from the first cylinder and/or the combustion chamber. It will be appreciated that while a single intake valve and a single exhaust valve are depicted, in some implementations an internal combustion engine may include more than one intake valve and/or more than one exhaust valve. Further, it will be appreciated that the intake valve and the exhaust valve may be selectively opened and closed by, for example, one or more cams which may be directly, or indirectly, rotatingly driven by a crankshaft. The actuation of the valves may be consistent with any of the previously described arrangements.

With continued reference to FIGS. 33 through 37, consistent with the illustrated example embodiment, the internal combustion engine 100a may include a second piston 114a, which may be reciprocatingly disposed within a second cylinder 116a. Reciprocating movement of the second piston 114a may draw a fluid into the second cylinder 116a via a fluid inlet 118a and may expel the fluid from the second cylinder 116a via a fluid outlet 120a. Consistent with the illustrated example embodiment, the second cylinder 116a may be at least partially included in the engine block 122a of the internal combustion engine 100a. In some such implementations, the second cylinder 116a may be arranged in a parallel, in-line configuration with the first cylinder 104a and/or in an offset configuration with the first cylinder (e.g., in a manner as generally described with respect to the multiple cylinders of precedingly described embodiments). Additionally, the second cylinder and second piston may haves diameters that are generally the same as the diameters of the first cylinder and the first piston (respectively). Further, in some embodiments, the second cylinder and second piston may have diameters that are different (e.g., either smaller or larger) than the diameters of the first cylinder and the first piston (respectively). Referring at least to FIG. 38, in some embodiments consistent with the present disclosure, an internal combustion engine 100b may be provided in which the first piston 102b and the first cylinder 104a may be disposed within the engine block 122b, while the second piston and the second cylinder may be disposed in a separate structure 124b, e.g., which may be adjacent to the engine block 122b, attached to and/or integrated with the engine block 122b, and/or may be separate from the engine block 122b.

A pressure accumulator 126a may be fluidly coupled with the fluid outlet 120a of the second cylinder 116a for receiving the fluid from the second cylinder 116a and providing a reservoir of pressurized fluid. For example, as generally described, the second piston 114a may be reciprocatingly driven within the second cylinder 116a, which may cause a fluid to be drawn in through the fluid inlet 118a, and expelled through the fluid outlet 120a. As such, the fluid expelled from the fluid outlet 120a may be at a greater pressure than the fluid at the fluid inlet 118a. Further, the fitment of the second piston within the second cylinder (e.g., which may be a provided by the relative tolerances of the piston and the cylinder and/or may be aided by features such as compression rings on the piston) may minimize the leakage of fluid past the second piston, and allow pressure to be generated in the fluid expelled from the second cylinder.

Figure 39:
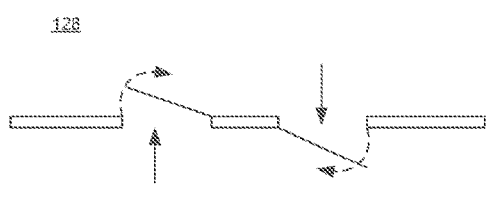
FIGS. 39 through 40 depict illustrative example embodiments of check valve arrangements that may be used in connection with a multiple cylinder internal combustion, according to a variety of example implementations.
Figure 40:
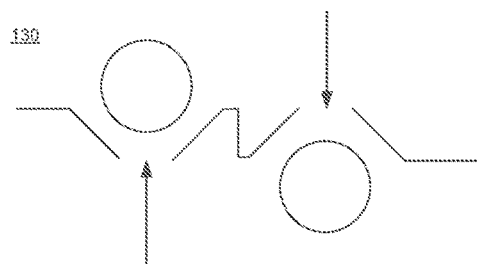

Further, the fluid inlet and fluid outlet of the second cylinder may include a check valve arrangement, e.g., which may further aid in the generation of pressure within the pressure accumulator. For example, as shown in FIGS. 39 and 40, and as is generally known, the check valve arrangement may include a reed valve 128 (FIG. 39), in which one or more flexible reeds may be associated with respect inlet and outlet opening. The flexible reeds may bend or flex to permit fluid flow through the opening in one direction, and may seal against the opening to prevent fluid flow through the opening in the other direction. In some embodiments, the check valve arrangement may include a ball check valve arrangement 130 (FIG. 40), in which balls may be moveably sealed in respective seats. The balls may separate from the seats to permit fluid flow in one direction, and may seal against the seats to prevent fluid flow in the other direction. It will be appreciated that a wide variety of additional and/or alternative check valve arrangements may be implemented, such as poppet valves, etc. As such, the present disclosure should be understood to include all such additional and/or alternative check valve arrangements.

Consistent with some example embodiments, the fluid may include a compressible fluid, and the pressure accumulator 126a may include a pressure vessel. For example, the pressure accumulator may include any vessel defining an internal volume that may receive the compressible fluid, with the pressure within the vessel building as additional compressible fluid is pumped into the pressure vessel. The accumulation of the pressure may, in some implementations, be a function of the compressibility of the fluid. In some particular example embodiments, the compressible fluid may include air (e.g., such as ambient air around the internal combustion engine 100a, which may be drawn into the inlet 118a associated with the second cylinder 116a).

Figure 41:
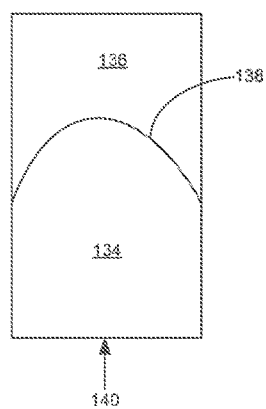
FIGS. 41 through 43 depict a variety of illustrative example embodiments of pressure accumulators, according to a variety of example implementations.
Figure 42:
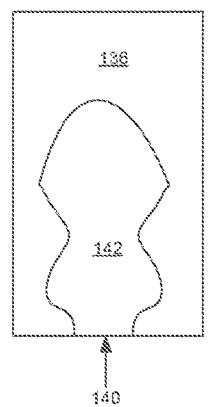
Figure 43:
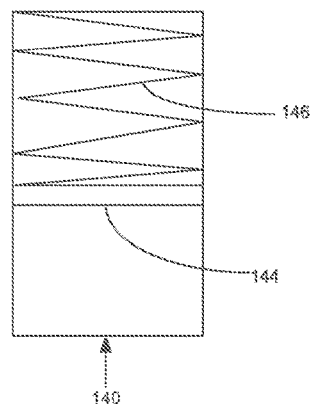
Figure 44:
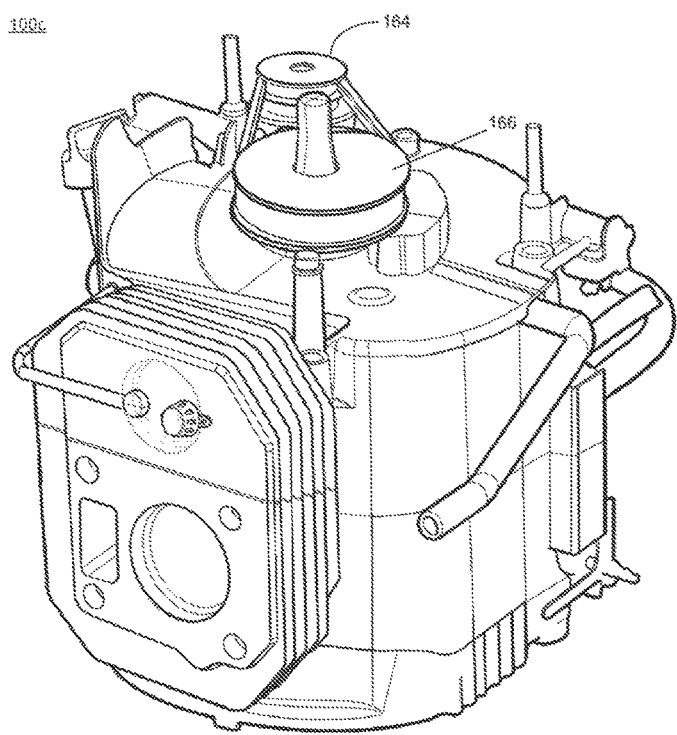
FIGS. 44 through 47 depict another illustrative example embodiment of a multiple cylinder internal combustion engine, according to an example implementations.
Figure 45:
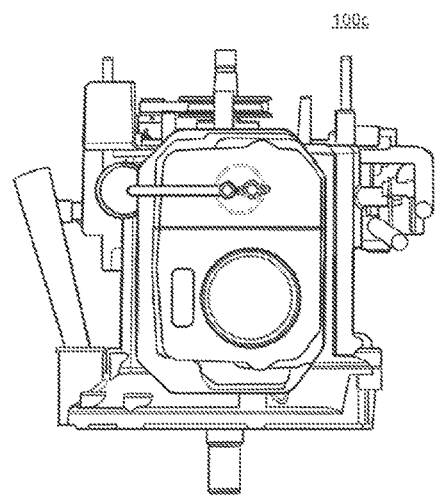
Figure 46:
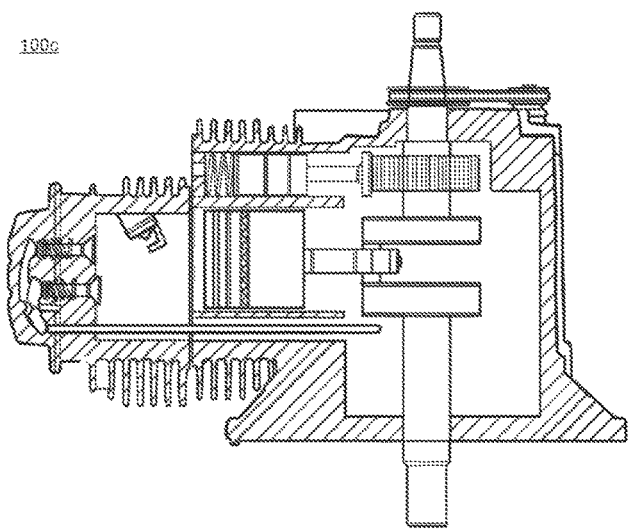
Figure 47:
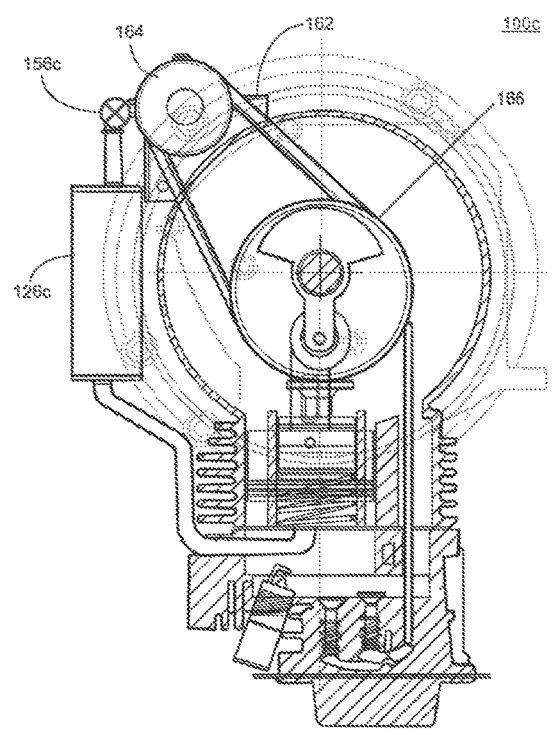

In some embodiments consistent with the present disclosure, the fluid may include a generally non-compressible fluid (e.g., a liquid, which, while having some degree of compressibility, is generally considered to be non-compressible by comparison to, for example, a gas). The non-compressible fluid may include, but is not limited to, engine oil, hydraulic fluid, coolant, etc. Consistent with such an embodiment, the pressure accumulator may include a pressure tank. As is generally known, a pressure tank may include a variable volume container that may be urged toward a first, smaller, volume by a compressible medium, and may be expanded to a second, larger, volume (including multiple and/or infinitely variable volumes between the first volume and the second volume) by compressing the compressible medium based on the pressure of the fluid in the variable volume container. For example, and referring to FIG. 41, an illustrative example embodiment of a pressure tank 132 is schematically depicted. As shown, the pressure tank 132 may include a variable volume 134 and a compressible medium 136, such as a gas (e.g., air). The variable volume 134 may be separated from the compressible medium 136 by, e.g., a flexible and/or elastic membrane 138. As fluid enters the variable volume 134 (e.g., via an inlet 140), the pressure of the fluid in the variable volume may act against the membrane 138 to exert pressure against the compressible medium 134, causing the compressible medium to compress to a reduced volume, thereby increasing the volume of the variable volume 134. Additionally, the compressed compressible medium may act against the membrane 138 to thereby pressurize the fluid in the variable volume 134. Consistent with related embodiments, as shown in FIGS. 42 and 43, the variable volume may be provided by a flexible and/or elastic bladder 142 surrounded by the compressible medium. Further, in another embodiment, as shown in FIG. 43, the compressible medium may include a spring 146 (and/or another compressible medium, such as a gas), which may act against a flexible or elastic membrane, a plunger 144, or the like. It will be appreciated that various additional and/or alternative arrangements may be utilized to accumulate pressurized fluid (including a non-compressible fluid). While the use of a pressure tank has generally been described in connection with the use of a non-compressible fluid, it will be appreciated that a pressure tank may similarly be used in connection with a compressible fluid, such as air.

Consistent with the present disclosure, the internal combustion engine may include a crankshaft 148, which may be coupled with the first piston and the second piston for rotational motion associated with reciprocating movement of the first piston and the second piston. As generally described above, in some implementations that crankshaft 148 may be coupled with the first piston 102a such that rotational motion of the crankshaft caused reciprocating movement of the first piston, and reciprocating movement of the first piston caused rotation of the crankshaft. Further, the crankshaft 148 may be coupled with the second piston 114a such that rotational motion of the crankshaft caused reciprocating movement of the second piston. In some embodiments, the second piston may be coupled with the crankshaft such that reciprocating movement of the second piston causes rotation of the crankshaft.

For example, in some embodiments the crankshaft may be coupled with the first piston via a first crank journal and may be coupled with the second piston via a second crank journal, as generally described in connection with the preceding embodiments. As described in connection with the preceding embodiments, the first and second pistons may be coupled with the crankshaft via a single crank journal and/or via two separate crank journals. Further, consistent with such embodiments, the connection of the first and second pistons with one or more crank journals may utilize any of the connecting rod configurations as previously described.

In some embodiments, the crankshaft 148 may be coupled with the first piston 102a via a first crank journal 150a, and may be coupled with the second piston 114a via a cam 152a. Consistent with such an embodiment, rotation of the crankshaft (and thereby of the cam) may impart reciprocating movement on the second piston, thereby causing the fluid to be drawn into the second cylinder and expelled to the pressure accumulator. In some embodiments, the internal combustion engine 100a may further include a return spring 154a associated with the second piston. The return spring 154a may be configured to maintain contact between a cam follower associated with the second piston and the cam. Consistent with various embodiments, the cam follower associated with the second piston may include a solid cam follower and/or a roller cam follower.

In some embodiments, the pressure accumulator may include a fluid outlet in selective fluid communication with a rotational drive system for selectively rotationally driving the crankshaft. The selective rotational driving of the crankshaft may, for example, be utilized for starting the internal combustion engine and/or assisting in starting the internal combustion engine. Consistent with some such embodiments, a less powerful starting system (e.g., a smaller electric starting motor and/or smaller starting battery) may be utilized, and/or easier manual starting (e.g., via a recoil starting system or other manual starting system) may be realized. Consistent with some such implementations, an outlet associated with the pressure accumulator (e.g., pressure accumulator 126a in FIG. 37) may include an outlet 156a and a selective valve 158a. While the outlet of the pressure accumulator is shown as a distinct outlet relative to the inlet, it will be appreciated that, in some embodiments, the pressure accumulator may include a combined inlet/outlet, with a T or branch connection providing fluid coupling with the second cylinder and with the valve. The valve 158 may be selectively opened (e.g., during starting) to allow the release of the pressurized fluid from the pressure accumulator 126a. The valve 158a may include an electronically actuated valve, a hydraulically actuated valve, a pneumatically actuated valve, a mechanically actuated valve, etc., which may be opened during starting of the internal combustion engine. For example, in connection with an internal combustion engine having electric starting capabilities, actuating a starting switch may, in addition to actuating a starting motor, open the valve, thereby allowing the release of the pressurized fluid from the pressure accumulator. In connection with an internal combustion engine having manual starting capabilities, actuating the starting mechanism (e.g., pulling on a recoil starter) may open the valve, thereby allowing the release of the pressurized fluid from the pressure accumulator. It will be appreciated that combinations of the foregoing may be utilized, e.g., in connection with an internal combustion engine that includes both electric starting capabilities and manual starting capabilities.

Figure 37:
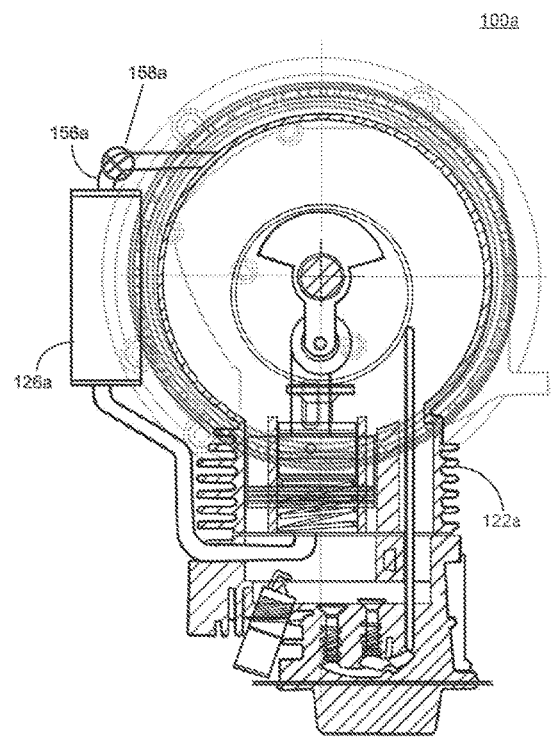
Figure 38:
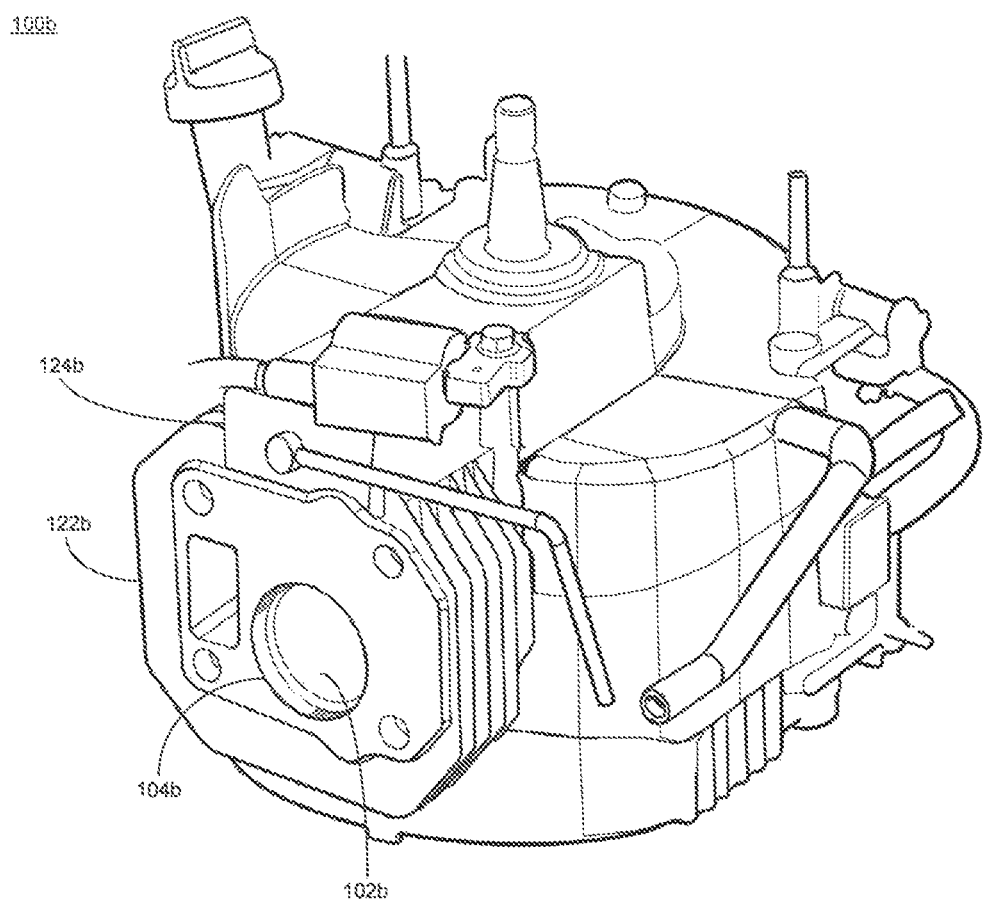
FIG. 38 depicts another illustrative example embodiment of a multiple cylinder internal combustion engine, according to an example implementation.

With particular reference to the illustrative example embodiment shown in FIGS. 34 through 37, in some implementations the rotational drive system may include a turbine 160 rotationally coupled with the crankshaft 148a. For example, as shown in FIG. 37, the outlet 156a of the pressure accumulator 126a may include a nozzle that is arranged to direct the release of the pressurized fluid (e.g., which may include pressurized air) to impinge the turbine 160 in a manner to cause rotation of the turbine, and thereby rotation of the crankshaft. Consistent with the illustrated embodiment, the turbine may be directly mounted to the crankshaft. In other embodiments, the turbine may be separately rotationally mounted and may be indirectly coupled with the crankshaft (e.g., via a gear train, a belt drive, a chain drive, etc.). In some particular embodiments, the turbine may be rotationally coupled with the crankshaft via a gear train, e.g., which may provide a torque multiplication between the turbine and the crankshaft. Such a configuration may, for example, convert a relatively high rotational speed of the turbine to a slower, but higher torque, rotation of the crankshaft. Further, in some implementations, the turbine may be coupled with the crankshaft via an overrunning clutch, which may, for example, allow the crankshaft to rotate independently of the turbine when the crankshaft speed is greater than the turbine speed (accommodating for any speed multiplication that may be provided by a gear train coupling the turbine and the crankshaft). In some such embodiments, parasitic power loss, which may result from the internal combustion engine driving the turbine during operation of the internal combustion engine, may be reduced and/or eliminated.

Consistent with some example embodiments, the rotational drive system may include a hydraulic motor rotationally coupled with the crankshaft. For example, referring FIGS. 44 through 47, an illustrative example embodiment of an internal combustion engine 100c is depicted. The internal combustion engine 100c may generally correspond to the illustrative example internal combustion engine 100a. As shown, the internal combustion engine 100c may include a hydraulic motor 162 coupled with the outlet of the pressure accumulator 126c. When the outlet of the pressure accumulator 126c is coupled with the hydraulic motor 162 (e.g., via the opening of valve 158c), the pressurized fluid (e.g., engine oil, hydraulic fluid, air, etc.) may flow through the hydraulic motor 162, rotating pulley 164 associated with the hydraulic motor. The pulley 164 may, in turn, rotating the crankshaft via pulley 166. As discussed above with respect to the previous embodiment, in addition/as an alternative to the depicted belt drive configuration, the hydraulic motor may be directly coupled with the crank shaft, may be coupled with the crankshaft via a gear train, may be coupled with the crankshaft via a chain drive, may include an overrunning clutch, etc., as well as various combinations of such configurations.

Figure 48:
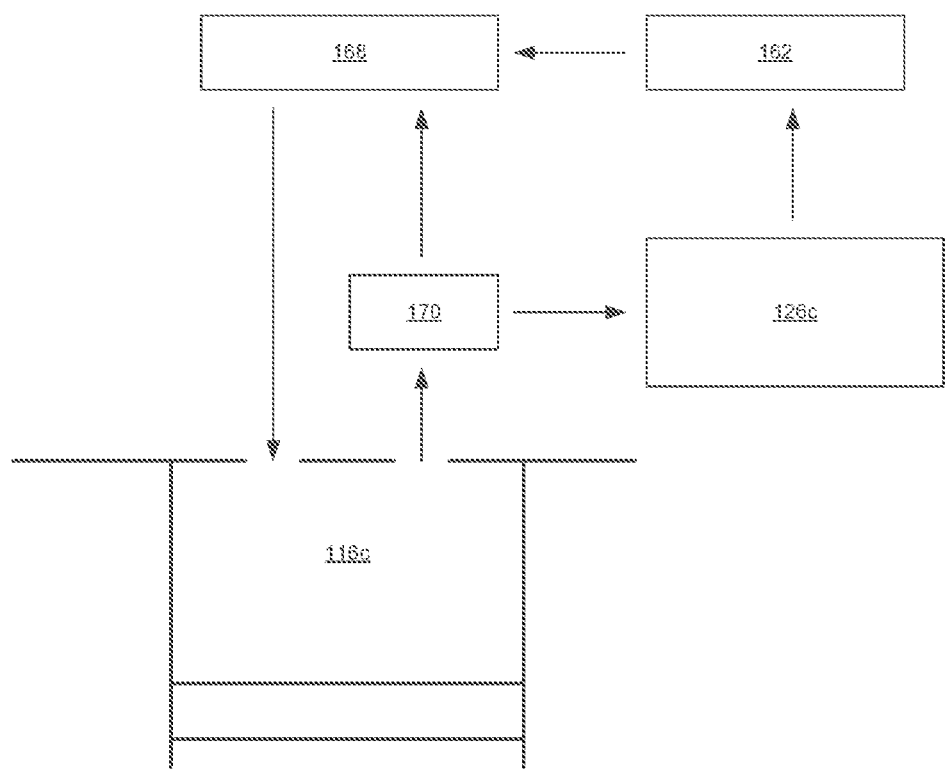
FIG. 48 schematically depicts an illustrative example embodiment of a hydraulic motor fluid pathway that may be utilized in connection with a multiple cylinder internal combustion engine according to an example implementation.

Referring also to FIG. 48, in some implementations, e.g., in which the fluid may include engine oil, hydraulic oil, and/or another fluid other than air, after being release from the pressure accumulator 126c and passing through the hydraulic motor 162, the fluid may pass to a reservoir 168. As discussed, in some implementations, the fluid may include engine oil. Consistent with such an implementation, the reservoir may include an oil reservoir, such as an engine crankcase. Further, in some such implementations, the internal combustion engine may be designed having an increased engine oil capacity to accommodate the additional use of the engine oil for operating the hydraulic motor. During operation of the internal combustion engine 100c, the fluid from the reservoir 168 may be pumped into the second cylinder 116c and then to the pressure accumulator 126c. In some embodiments, the fluid system may include a bypass 170, e.g., which may allow the fluid pumped from the second cylinder to return to the reservoir when a maximum desired pressure and/or volume of fluid within the pressure accumulator has been achieved.

According to an implementation consistent with the present disclosure, an internal combustion engine may include a first piston reciprocatingly disposed in a first cylinder, and a combustion chamber fluidly coupled with the first cylinder. An ignition source may be at least partially disposed within the combustion chamber. An intake valve may provide selective fluid communication between an intake system and the combustion chamber, and an exhaust valve may provide selective fluid communication between an exhaust system and the combustion chamber. The first piston and cylinder may include a fired cylinder, as generally discussed above. Further, in some implementations, the internal combustion engine may include more than one fired cylinder, as also generally discussed above. The internal combustion engine may additionally include second piston may be reciprocatingly disposed within a second cylinder. An inlet associated with the second cylinder may be fluidly coupled with the intake system, and an outlet associated with the second cylinder may be fluidly coupled with one or more of the first cylinder and the combustion chamber. A crankshaft may be coupled with the first piston and the second piston for rotational motion associated with reciprocating movement of the first piston and the second piston. According to such an implementation, the second cylinder may draw air and/or a fuel-air mixture from the intake system and may pump it into the first cylinder, thereby increasing the fuel-air charge available for combustion by the first cylinder and/or increasing the pressure within the first cylinder and/or the combustion chamber. As such, the second cylinder may provide a form of forced induction for the first cylinder, which may, in some implementations, increase the power output provided by the first cylinder as compared to the power that may be realized by the first cylinder using natural aspiration.

With reference to FIGS. 49 through 53, an internal combustion engine 200a is generally shown. Similar with previously described embodiments, the internal combustion engine 200a may include an air-cooled, four stroke engine, however, as with the previously described embodiments, other implementations may be utilized. In a similar manner as previous embodiments, the internal combustion engine 200a may include a first piston 202a reciprocatingly disposed in a first cylinder 204a, and a combustion chamber 206a fluidly coupled with the first cylinder. An ignition source 208a may be at least partially disposed within the combustion chamber 206a. An intake valve 210a may provide selective fluid communication between an intake system (e.g., such as a carburetor, fuel injection system, intake runner and/or intake manifold) and the combustion chamber 206a, and an exhaust valve 212a may provide selective fluid communication between an exhaust system (such as an exhaust runner, and exhaust manifold, and/or a muffler) and the combustion chamber 206a.

Figure 51:
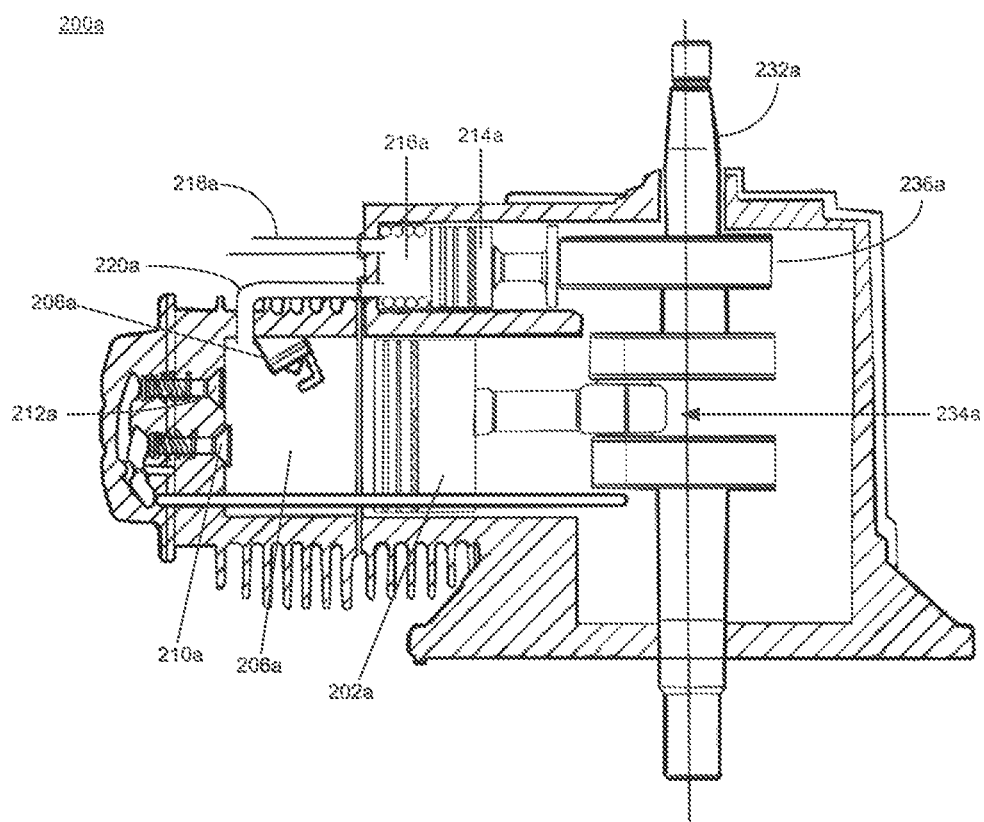
Figure 52:
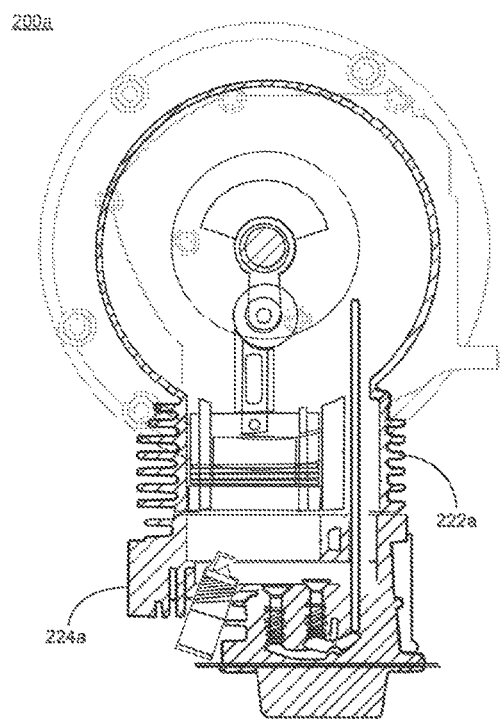
Figure 53:
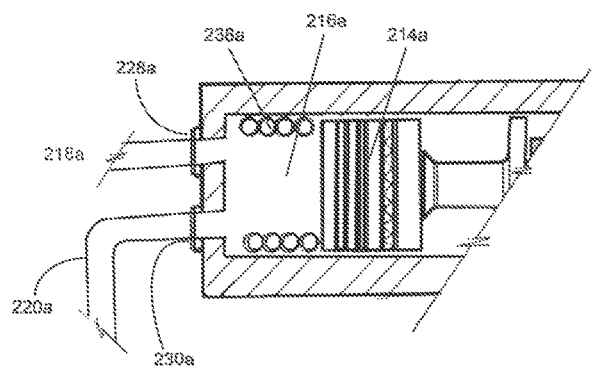
Figure 54:
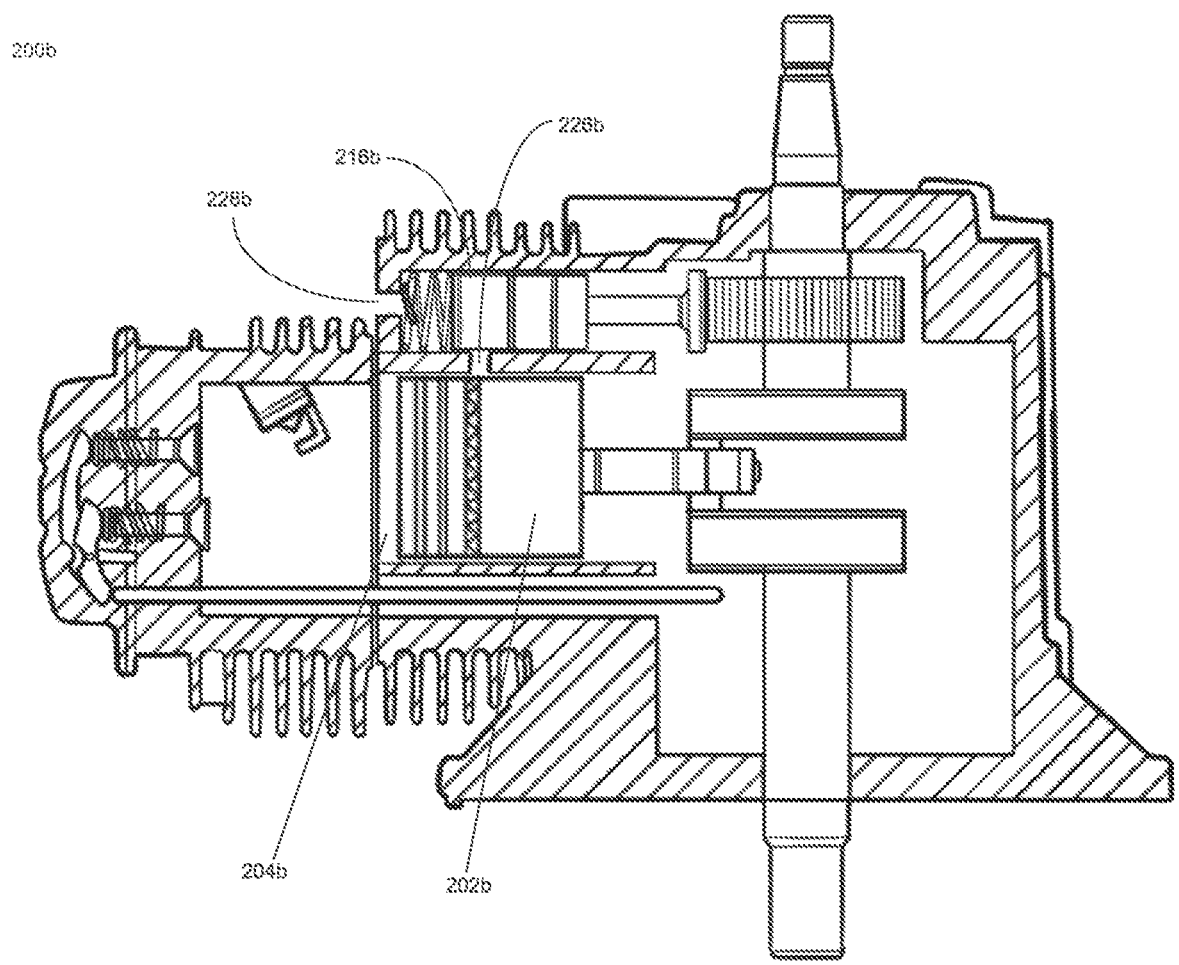
FIG. 54 depicts another illustrative example embodiment of a multiple cylinder internal combustion engine, according to an example implementation.

Consistent with some embodiments, the internal combustion engine 200a may additionally include a second piston 214a that may be reciprocatingly disposed within a second cylinder 216a. As generally discussed above, the second cylinder may have a generally similar diameter as the first cylinder, and/or may have a larger or smaller diameter than the first cylinder An inlet 218a associated with the second cylinder 216a may be fluidly coupled with the intake system (e.g., intake system 218a, which may, as previously mentioned, include one or more of a carburetor, a fuel injection system, an intake runner, and/or an intake manifold), and an outlet 220a associated with the second cylinder which may be fluidly coupled with one or more of the first cylinder 202a and the combustion chamber 206a. For example, as shown in FIG. 51, in one embodiment, the outlet 220a of the second cylinder 216a may include a fluid conduit (e.g., which may include, for example, a tube, or other fluid passage extending between the second cylinder 216a and the combustion chamber 206a, or may include a fluid passage formed within one or more of an engine block 222a and a cylinder head 224a of the internal combustion engine 200a. With additional reference to FIG. 54, in an embodiment, the outlet associated with the second cylinder 216b may be fluidly coupled with a port 226b between the second cylinder 216b and the first cylinder 204b, for example, formed in the engine block of the internal combustion engine 200b.

Consistent with some embodiments, reciprocating movement of the second piston 214a may draw a fuel-air mixture into the second cylinder 216a from the intake system 218a, and may expel the fuel-air mixture into one or more of the first cylinder 204a and the combustion chamber 206a. For example, the second piston 214a may expel the fuel-air mixture into one or more of the first cylinder 204a and the combustion chamber 206a during a compression stroke of the first piston, and/or at an end of the intake stroke of the first piston (for example, after the intake valve 210a has closed). Consistent with such an embodiment, the fuel-air mixture forced into the first cylinder and/or the combustion chamber by the second piston may have a reduced tendency to force a fuel-air mixture drawn into the first cylinder by the first piston (e.g., during the intake cycle) out of the first cylinder and/or combustion chamber through the intake valve. That is, the naturally aspirated fuel-air mixture in the first cylinder and/or the combustion chamber may be substantially retained. In this manner, the fuel-air mixture forced into the first cylinder and/or the combustion chamber by the second piston may increase the amount of fuel-air mixture within the first cylinder and/or the combustion chamber, as compared to the amount of fuel-air mixture that would otherwise be taken into the first cylinder and/or the combustion chamber via natural aspiration of the internal combustion engine 200a. As such, the operation of the second piston and second cylinder may provide a degree of forced induction. The forced induction provided by the operation of the second piston and second cylinder may increase the power output and/or another operation characteristic of the internal combustion engine, e.g., relative to natural aspiration. It will be appreciated that, for example, depending upon the pressure achieved by the second piston and the second cylinder, in addition and/or as an alternative to expelling the fuel-air mixture into the first cylinder and/or the combustion chamber at the end of the intake stroke and/or during the compression stroke, the second piston may also expel the fuel-air mixture into the first cylinder and/or the combustion chamber during the intake stroke and/or the power stroke of the first piston.

According to some embodiments consistent with the present disclosure, the inlet associated with the second cylinder may include a check valve arrangement (e.g., check valve 228a, 228b) between the intake system and the second cylinder. As generally shown, and as described above, the check valve arrangement may include a reed valve, a ball check valve, a poppet check valve, or the like. Further, in some embodiments, the outlet associated with the second cylinder 216a may include a check valve arrangement (e.g.

check valve 230*a*) between the second cylinder and the one or more of the first cylinder 204*a* and the combustion chamber 206*a*. In some embodiments, the check valve between the second cylinder and the first cylinder and/or the combustion chamber may reduce and/or prevent the propagation of combustion from the first cylinder and/or the combustion chamber into the second cylinder (e.g., which may combust any residual fuel-air mixture within the second cylinder). In some embodiments, such as shown with respect to the internal combustion engine 200*b* shown in FIG. 54, which may include a port 226*b* between the second cylinder 216*b* and the first cylinder 204*b*, the positon of the first piston 202*b* during combustion may at least partially, and/or fully, block the port 226*b*, thereby preventing and/or reducing the propagation of combustion from the first cylinder to the second cylinder.

In a similar manner as described with respect other embodiments here, the internal combustion engine 200*a* may include a crankshaft 232*a* that may be coupled with the first piston 202*a* and the second piston 214*a* for rotational motion associated with reciprocating movement of the first piston 202*a* and the second piston 214*a*. For example, rotation of the crankshaft may result in reciprocating movement of the first piston, and reciprocating movement of the first piston may result in rotation of the crankshaft. Similarly, rotation of the crankshaft may at least result in reciprocating movement of the second piston. In some embodiments, crankshaft 232*a* may be coupled with the first piston 202*a* via a first crank journal 234*a*, and may be coupled with the second piston via a second crank journal, e.g., as generally described above and depicted in connection with various embodiments. Further, in some such embodiments, the first piston and the second piston may be coupled with respective first and second crank journals and/or may both be coupled with a single crank journal. Various connecting rod configurations, as described previously, may be implemented.

In some embodiments consistent with the present disclosure, the crankshaft 232*a* may be coupled with the first piston 202*a* via a first crank journal 234*a*, and may be coupled with the second piston 214*a* via a cam 236*a*. The cam 236*a* may be directly (as depicted) and/or indirectly coupled with the crankshaft (e.g., may reside on a separate cam shaft that may be rotationally coupled with the crankshaft). Accordingly, rotation of the cam 236*a* (resulting from rotation of the crankshaft 232*a*) may reciprocatingly drive the second piston 214*a*. As previously described, the second piston may interact with the cam via a solid cam follower and/or a roller cam follower. In some embodiments, a return spring 238*a* may be associated with the second piston 214*a*. The return spring 238*a* may be configured to maintain contact between a cam follower associated with the second piston 214*a* and the cam 236*a*.

Figure 55:
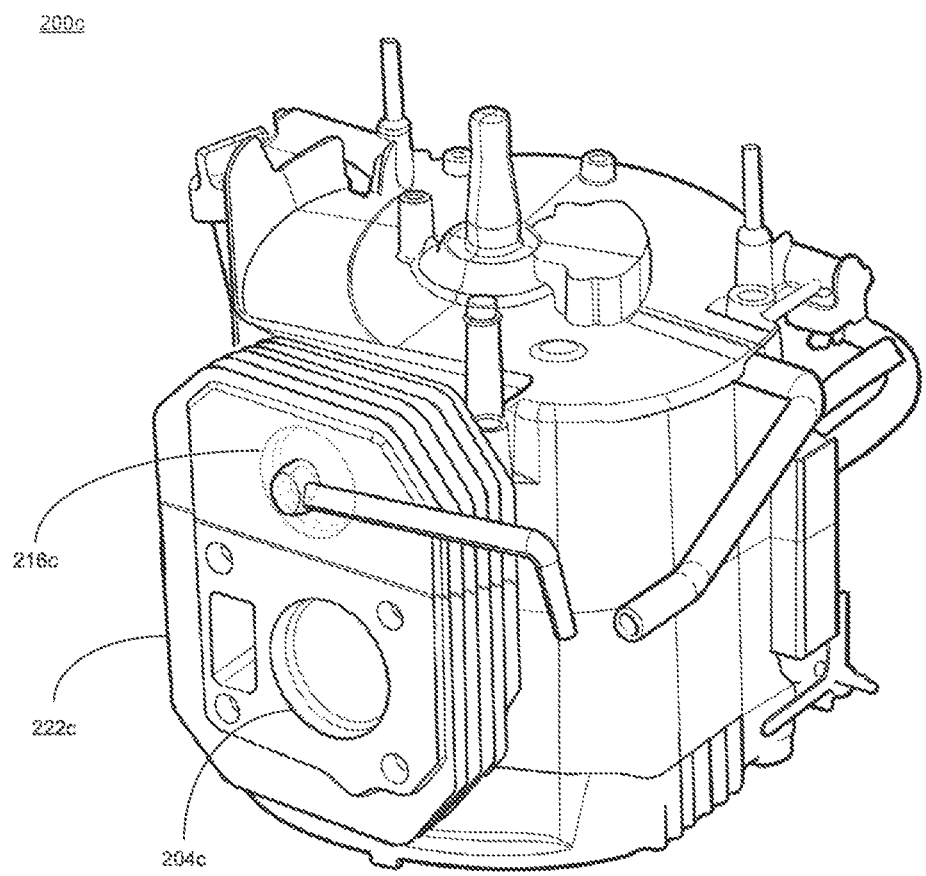
FIG. 55 depicts another illustrative example embodiment of a multiple cylinder internal combustion engine, according to an example implementation.
Figures 56, 57:
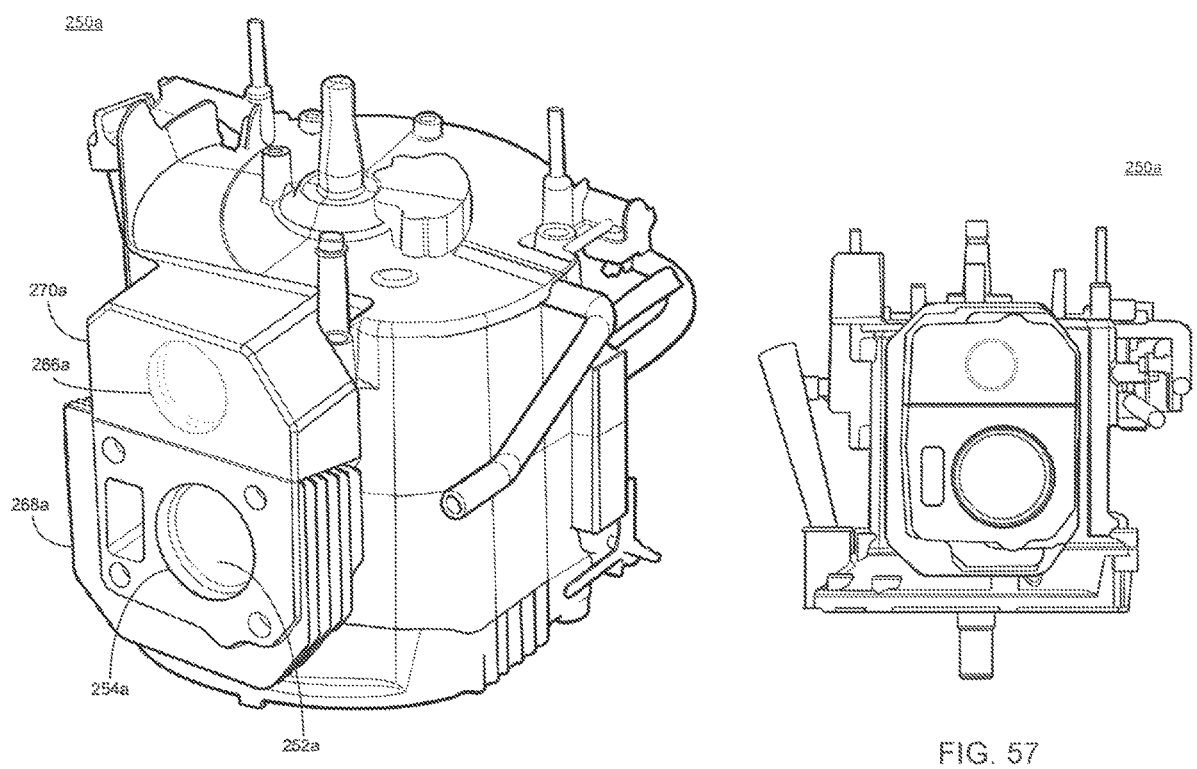
FIGS. 56 through 59 depict another illustrative example embodiment of a multiple cylinder internal combustion engine, according to an example implementation.
Figure 58:
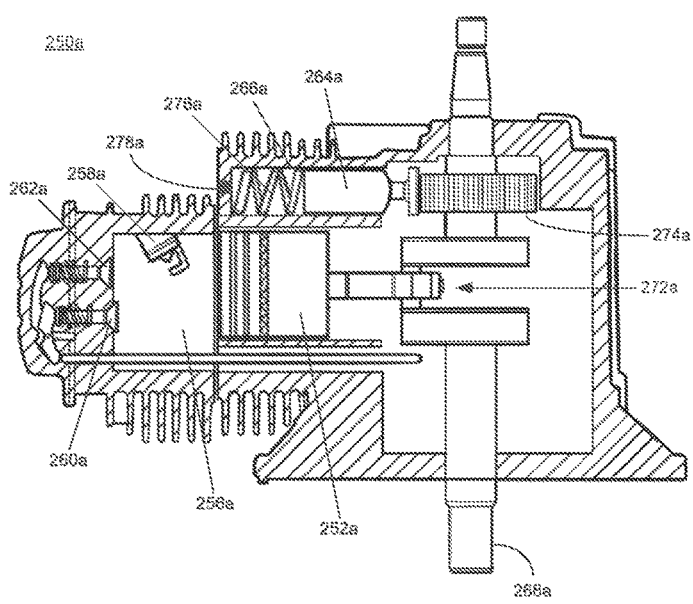
Figure 59:
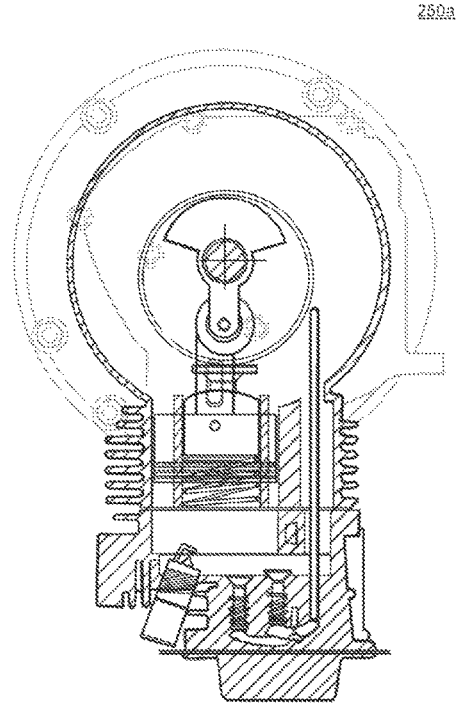

As generally shown in, e.g., FIG. 49, in some embodiments the second cylinder 216*a* may generally be disposed in a housing 240*a* that may be adjacent to the engine block 222*a*, attached to the engine block, and/or at least partially integrated with the engine block. With additional reference to FIG. 55, in some embodiments, the second cylinder 216*c* may be formed and/or integrated within the engine block 222*c*, along with the first cylinder 204*c*. It will be appreciated that various additional and/or alternative configurations may be implemented.

In some implementations consistent with the present disclosure, an internal combustion engine (including, but not limited to, an air cooled, four stroke internal combustion engine) that may include a first piston (and/or more than one pistons) reciprocatingly disposed in a first cylinder (and/or more than one respective cylinders), and a combustion chamber fluidly coupled with the first cylinder. An ignition source may be at least partially disposed within the combustion chamber. An intake valve may provide selective fluid communication between an intake system and the combustion chamber, and an exhaust valve may provide selective fluid communication between an exhaust system and the combustion chamber. A second piston may be reciprocatingly disposed within a second cylinder. A crankshaft may be coupled with the first piston and the second piston for rotational motion associated with reciprocating movement of the first piston and the second piston. Consistent with such an implementation, the second piston and the second cylinder may not be fired (i.e., may not be exposed to combustion of a fuel-air mixture for generating power). In some such embodiments, the reciprocation of the second piston may, for example, impart vibration on the internal combustion engine which may, for example, at least partially counterbalance a vibration resulting from the reciprocation of the first piston, combustion of a fuel-air mixture in the first cylinder and/or the combustion chamber, rotation of the camshaft, and the like. In some embodiments, the reciprocation of the second piston may impart vibration on the internal combustion engine which may, at least in part, tune a vibrational characteristic of the internal combustion engine (i.e., may change a vibrational characteristic of the internal combustion engine relative to the vibrational characteristic in the absence of the second piston).

For example, and referring to FIGS. 56 through 59, an illustrative example embodiment of an internal combustion engine 250*a* may include a first piston 252*a* reciprocatingly disposed in a first cylinder 254*a*, and a combustion chamber 256*a* fluidly coupled with the first cylinder 254*a*. An ignition source 258*a* may be at least partially disposed within the combustion chamber 256*a*. An intake valve 260*a* may provide selective fluid communication between an intake system (e.g., which may include a carburetor, a fuel injection system, an intake runner, and/or an intake manifold) and the combustion chamber 256*a*, and an exhaust valve 262*a* may provide selective fluid communication between an exhaust system (e.g., which may include an exhaust runner, an exhaust manifold, and/or a muffler) and the combustion chamber 256*a*. As generally discussed above, the first cylinder may include a fired cylinder, in that the first piston may be exposed to combustion of a fuel-air mixture within the combustion chamber and/or the first cylinder to cause reciprocating movement of the first piston.

Figure 60:
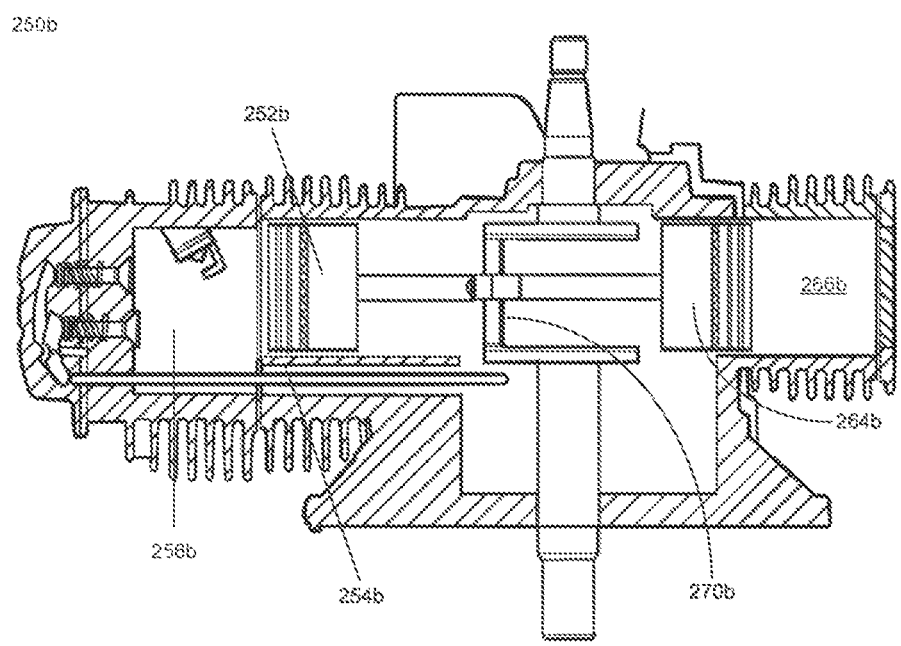
FIG. 60 depicts another illustrative example embodiment of a multiple cylinder internal combustion engine, according to an example implementation.

The internal combustion engine 250*a* may further include a second piston 264*a* that may be reciprocatingly disposed within a second cylinder 266*a*. Consistent with some embodiments, the second piston may include a reciprocating mass. For example, as shown, e.g., in FIG. 58, the second piston 264*a* may be generally configured as a cylindrical body to provide a reciprocating mass. As depicted, the second piston 264*a* may be differently configured relative to the first piston 252*a*. In some implementations, the second piston may be generally similarly configured as the first piston. For example, as shown in FIG. 60, the second piston 264*b* may be generally similarly configured as the first piston 252*b*. For example, the second piston may include piston rings, and the like. In some such implementations, configuring the second piston similarly to the first piston may reduce the number of discrete components required for the internal combustion engine.

Continuing with the foregoing, in which the second piston may be configured as a reciprocating mass, in some implementations, the reciprocating mass may at least partially counterbalance reciprocating movement of the first piston. For example, in an embodiment the second piston may be configured to reciprocate out of time with the first piston, e.g., such that when the first piston is reciprocating in a first direction, the second piston may be reciprocating in a second, generally opposite direction. In some implementations, the movement of the second piston may lessen vibrations imparted on the internal combustion engine by one or more of the reciprocation of the first piston, the combustion of a fuel-air mixture in the combustion chamber and/or the first cylinder, and/or the rotation of the crankshaft.

Consistent with some implementations, the reciprocating mass of the second piston may tune a vibrational characteristic of the internal combustion engine. For example, the reciprocating may of the second piston may induce a vibration in the internal combustion engine. The frequency and magnitude of the vibration induced by the second piston may change a frequency and/or magnitude of other vibrations imparted on the internal combustion engine by one or more of the reciprocation of the first piston, the firing of the combustion process, and/or the rotation of the crankshaft. By changing the frequency and/or magnitude of vibration in the internal combustion engine, the internal combustion engine (and/or a piece of power equipment powered by the internal combustion engine) may exhibit a more favorable sound and/or feel experienced by users of the internal combustion engine or piece of power equipment. It will be appreciated that the mass (e.g., including the size and material) and frequency of reciprocation of the second piston may be selected to achieve the desired tuning effect.

Consistent with various embodiments, the second cylinder may be disposed within and/or formed within an engine block $268a$ of the internal combustion engine $250a$, which may also include the first cylinder $254a$. For example, the first cylinder and the second cylinder may be arranged in a generally parallel, in-line configuration, an offset configuration, or the like, as generally described above. In some embodiments, the second cylinder may be disposed within a feature of the internal combustion engine that may be distinct from the engine block. For example, as shown in the illustrative example embodiment in FIG. 56, the second cylinder may be formed within feature $270a$, which may be adjacent to, but distinct from, the engine block $268a$. Further, in some embodiments, the second cylinder may be formed in a feature of the internal combustion engine that may not be proximate the first cylinder. In some such embodiments, the second piston may be at least partially offset from the first piston. Further, in some implementations, the second piston may be in a generally opposed configuration relative to the first piston. For example, and with reference to the illustrative example embodiment shown in FIG. 60, the second cylinder $266b$ may be formed on an opposed side of the internal combustion engine $250b$ relative to the first cylinder $254b$. It will be understood that other configurations may equally be implemented. Additionally, as generally described herein, according to various embodiments, the first cylinder and the second cylinder may have generally similar diameters, and/or the second cylinder may have a diameter that is greater than or less than the diameter of the first cylinder.

The internal combustion engine $250a$ may additionally include a crankshaft $258a$ may be coupled with the first piston $252a$ and the second piston $254a$ for rotational motion associated with reciprocating movement of the first piston and the second piston. As described above, reciprocating motion of the first piston may cause rotation of the crankshaft, and rotation of the crankshaft may cause reciprocating motion of the first piston. Further, rotation of the crankshaft may at least cause reciprocating motion of the second piston. In some embodiments, the crankshaft may be coupled with the first piston via a first crank journal, and may be coupled with the second piston via a second crank journal. For example, and with reference to FIG. 60, as shown the crankshaft $258b$ may be coupled with the first piston $254b$ via a crank journal $272b$. Similarly, the crankshaft $258b$ may be coupled with the second piston $264b$ via the crank journal $272b$. In some embodiments, the first piston and the second piston may be coupled with the crankshaft via separate crank journals, as generally described above.

In some embodiments, the crankshaft may be coupled with the first piston via a first crank journal, and may be coupled with the second piston via a cam. For example, and referring to FIG. 58, the first piston $202a$ may be coupled with the crankshaft $258a$ via a crank journal $272a$, and the second piston $264a$ may be coupled with the crankshaft $258a$ via cam $274a$. The cam $274a$ may be rotated (directly and/or indirectly) by the crankshaft, which may cause the second piston $264a$ to reciprocated within the second cylinder $266a$. In some embodiments, a return spring $276a$ may be associated with the second piston $264a$, and may be configured to maintain contact between a cam follower associated with the second piston and the cam $274a$. The cam follower associated with the second piston may include a solid cam follower and/or may include a roller cam follower.

Consistent with some embodiments, the second cylinder $266a$ may include a vent $278a$ allowing air to enter and exit the second cylinder during reciprocation of the second piston. Accordingly, the reciprocation of the second piston may not be required to compress air contained in the second cylinder. In some embodiments, the fitment between the second piston and the second cylinder may be loose enough to allow air (and/or another fluid) to pass between the sidewalls of the cylinder and the piston, thereby decreasing and/or eliminating the need for the second piston to compress air contained in the second cylinder.

Figure 61:
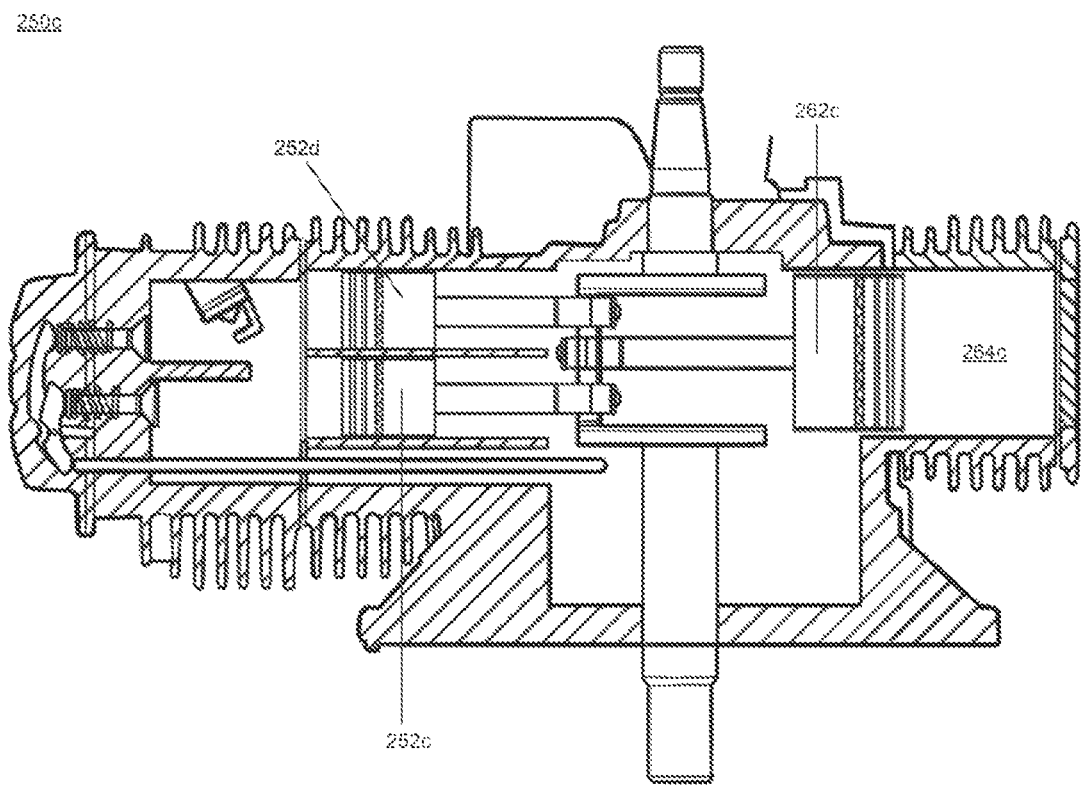
FIG. 61 depicts another illustrative example embodiment of a multiple cylinder internal combustion engine, according to an example implementation.
Figure 62:
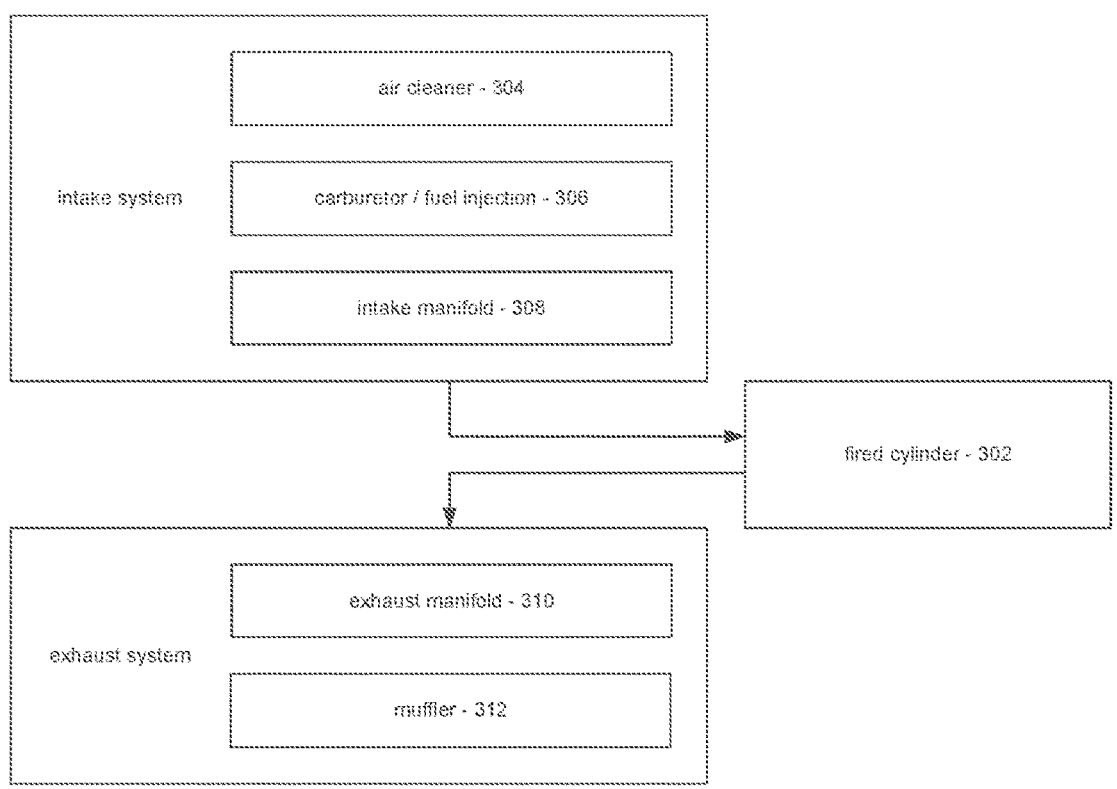
FIG. 62 is a block diagram of an intake system and an exhaust system that may be used in connection with a multiple cylinder internal combustion engine, according to an example implementation.

With reference to FIG. 61, another illustrative example embodiment is generally depicted. As shown, similar to the previous embodiment, an internal combustion engine $250c$ is shown, including a non-fired second piston $264c$, which may, for example tune a vibrational characteristic of the internal combustion engine. Additionally, the internal combustion engine $250c$ may include multiple fired cylinders (e.g., including pistons $252c$, $252d$), which may be generally configured in any manner as discussed above. It will be appreciated that while the second piston $264c$ is shown arranged in an opposed configuration relative to the fired pistons $252c$, $252d$, that other configurations, such as parallel, in-line, and offset relative to the fired pistons may equally be utilized.

Referring to FIG. 61, a block diagram of a portion of an internal combustion engine 300 is depicted. As is commonly known, the internal combustion engine 300 may include a fired cylinder 302, as generally described above. Additionally, as is also commonly known, and has been discussed above, the internal combustion engine 300 may generally include an intake system. The intake system may include, but is not limited to, one or more of an air cleaner 304 (e.g., which may remove at least a portion of particulate matter from intake air), a carburetor 306 and/or fuel injection system (e.g., which may disperse and/or atomize fuel in the intake air to provide a fuel-air mixture), and/or an intake manifold 308 (e.g., which may include a fluid conduit for directing the fuel-air mixture to the fired cylinder and may include one or more conduits external to the engine and/or one or more fluid pathways through a portion of the engine to the intake valve of the fired cylinder). Similarly, the internal combustion engine 300 may include an exhaust system that may include, but is not limited to, one or more of an exhaust manifold 310 (e.g., which may include a fluid pathway from the exhaust valve through at least a portion of the engine and/or one or more fluid conduits external to the engine), and/or a muffler 312 (e.g., which may decrease a volume of the exhaust exiting the engine). The foregoing depiction is intended for the purpose of completeness, as the components of the intake system and the exhaust system may be conventional and are commonly known. As such, detailed depiction is not required for the understanding of the individual components and features.

A variety of illustrative example embodiments have been described, each including a variety of features, concepts, and arrangements. It will be appreciated that features, concepts, and arrangements disclosed in the context of one, or several, discrete embodiments are susceptible to application in other embodiments, and/or susceptible to combination with features, concepts, and/or arrangements discussed relative to multiple different embodiments. Herein, such combination of features, concepts, and arrangements from the several embodiments is expressly intended to be within the scope of the present disclosure.

A variety of feature, advantages, implementations, and embodiments have been described herein. However, it will be appreciated that the foregoing description and the depicted embodiments are only intended for the purpose of illustration and explanation, and should not be construed as a limitation on the present invention. It will be appreciated that the features and concepts associated with the various embodiments are susceptible to combination with features and concepts of other disclosed embodiments. Additionally, it will be appreciated that the concepts embodied by the description and illustration are susceptible to variation and modification, all of which are intended to be encompassed by the present invention.

What is claimed is:

1. An internal combustion engine comprising:
   a first piston reciprocatingly disposed in a first cylinder;
   a second piston reciprocatingly disposed in a second cylinder;
   a crankshaft coupled with the first piston and the second piston for rotational motion associated with reciprocating movement of at least one of the first piston and the second piston;
   a combustion chamber fluidly coupled with the first cylinder and the second cylinder to continuously define a fluid volume including the combustion chamber, the first cylinder, and the second cylinder;
   an ignition source at least partially disposed within the combustion chamber;
   an intake valve providing selective fluid communication between an intake system and the combustion chamber; and
   an exhaust valve providing selective fluid communication between an exhaust system and the combustion chamber;
   wherein a centerline between the intake valve and the exhaust valve is generally centered between the first cylinder and the second cylinder.

2. The internal combustion engine according to claim 1, wherein the crankshaft is configured to be disposed in a generally vertical orientation during operation.

3. The internal combustion engine according to claim 1, wherein the first cylinder and the second cylinder are arranged in a parallel-inline configuration.

4. The internal combustion engine according to claim 1, wherein the first cylinder and the second cylinder are arranged in an offset configuration.

5. The internal combustion engine according to claim 1, wherein the first cylinder and the second cylinder have substantially the same diameter.

6. The internal combustion engine according to claim 1, wherein the first cylinder and the second cylinder have different diameters.

7. The internal combustion engine according to claim 1, wherein the crankshaft is coupled with the first piston via a first crank journal and coupled with the second piston via a second crank journal.

8. The internal combustion engine according to claim 1, wherein the crankshaft is coupled with the first piston and the second piston via a first crank journal.

9. The internal combustion engine according to claim 1, wherein the combustion chamber includes a cavity overlying at least a portion of the first cylinder and at least a portion of the second cylinder.

10. The internal combustion engine according to claim 1, wherein the combustion chamber includes:
    a first cavity portion at least partially overlying at least a portion of the first cylinder; and
    a second cavity portion at least partially overlying at least a portion of the second cylinder;
    wherein the first cavity portion is at least partially separated from the second cavity portion.

11. The internal combustion engine according to claim 1, wherein the ignition source includes a spark plug.

12. The internal combustion engine according to claim 11, wherein the ignition source includes a first spark plug associated with the first cylinder and a second spark plug associated with the second cylinder.

13. The internal combustion engine according to claim 1, wherein the intake valve and the exhaust valve are arranged in an overhead valve configuration.

14. The internal combustion engine according to claim 1, wherein the intake valve and the exhaust valve are arranged in a flathead configuration.

15. An internal combustion engine comprising:
    a first piston reciprocatingly disposed in a first cylinder;
    a second piston reciprocatingly disposed in a second cylinder, the second piston having a diameter less than a diameter of the first piston, wherein the second piston is disposed vertically above the first piston during operation;
    a crankshaft coupled with the first piston and the second piston for rotational motion associated with reciprocating movement of at least one of the first piston and the second piston, wherein the first piston and the second piston are coupled with the crankshaft in substantially the same rotational orientation, the crankshaft configured to be disposed in a generally vertical orientation during operation;
    a combustion chamber fluidly coupled with the first cylinder and the second cylinder to continuously define a fluid volume including the combustion chamber, the first cylinder, and the second cylinder;
    an ignition source at least partially disposed within the combustion chamber;
    an intake valve providing selective fluid communication between an intake system and the combustion chamber; and an exhaust valve providing selective fluid communication between an exhaust system and the combustion chamber.

16. The internal combustion engine according to claim 15, wherein the first cylinder and the second cylinder are formed in an engine block, the engine block including a plurality of cooling fins configured to provide air cooling of the internal combustion engine.

17. The internal combustion engine according to claim 15, wherein the crankshaft is coupled with the first piston and the second piston via a first crank journal.

18. The internal combustion engine according to claim 15, wherein the crankshaft is coupled with the first piston via a first crank journal and is coupled with the second piston via a second crank journal.

19. An internal combustion engine comprising:
- a first piston reciprocatingly disposed in a first cylinder, the first cylinder having a first diameter;
- a second piston reciprocatingly disposed in a second cylinder, the second cylinder having a second diameter that is substantially the same as the first diameter;
- a crankshaft coupled with the first piston and the second piston for rotational motion associated with reciprocating movement of at least one of the first piston and the second piston, wherein the first piston and the second piston are coupled with the crankshaft in substantially the same rotational orientation, the crankshaft configured to be disposed in a generally vertical orientation during operation;
- a combustion chamber fluidly coupled with the first cylinder and the second cylinder to continuously define a fluid volume including the combustion chamber, the first cylinder, and the second cylinder;
- an ignition source at least partially disposed within the combustion chamber;
- an intake valve providing selective fluid communication between an intake system and the combustion chamber; and
- an exhaust valve providing selective fluid communication between an exhaust system and the combustion chamber.

20. The internal combustion engine according to claim 19, wherein the first cylinder and the second cylinder are formed in an engine block, the engine block including a plurality of cooling fins configured to provide air cooling of the internal combustion engine.

* * * * *